(12) United States Patent
Bohner et al.

(10) Patent No.: US 8,910,602 B2
(45) Date of Patent: Dec. 16, 2014

(54) CONTROL VALVE COMPRISING AN INTEGRATED FILTER AND CAM SHAFT PHASE SETTER COMPRISING SAID CONTROL VALVE

(71) Applicant: Schwäbische Hüttenwerke Automotive GmbH, Aalen-Wasseralfingen (DE)

(72) Inventors: Jürgen Bohner, Bad Waldsee (DE); Jens Krüger, Bad Schussenried (DE); Uwe Meinig, Bad Saulgau (DE)

(73) Assignee: Schwabische Huttenwerke Automotive GmbH, Aalen-Wasseralfingen (DE)

( * ) Notice: Subject to any disclaimer, the term of this patent is extended or adjusted under 35 U.S.C. 154(b) by 126 days.

(21) Appl. No.: 13/644,551

(22) Filed: Oct. 4, 2012

(65) Prior Publication Data

US 2013/0092113 A1    Apr. 18, 2013

(30) Foreign Application Priority Data

Oct. 5, 2011  (DE) .......................... 10 2011 084 059

(51) Int. Cl.
| | |
|---|---|
| *F01L 1/344* | (2006.01) |
| *F15B 21/04* | (2006.01) |
| *F01L 1/46* | (2006.01) |
| *F15B 13/04* | (2006.01) |
| *F16K 1/32* | (2006.01) |

(52) U.S. Cl.
CPC ................ *F16K 1/32* (2013.01); *F15B 21/041* (2013.01); *F01L 1/46* (2013.01); *F15B 13/0402* (2013.01); *F01L 1/3442* (2013.01)
USPC ...................................................... 123/90.17

(58) Field of Classification Search
CPC ................ F01L 2001/3443; F01L 2001/3444; F01L 1/3442; F01L 2001/34433; F01L 2001/34479; F01L 2001/34483
USPC ............................................ 123/90.15, 90.17
See application file for complete search history.

(56) References Cited

U.S. PATENT DOCUMENTS

| | | | |
|---|---|---|---|
| 6,971,353 | B2 | 12/2005 | Heinze et al. |
| 7,389,756 | B2 | 6/2008 | Hoppe et al. |

(Continued)

FOREIGN PATENT DOCUMENTS

| | | |
|---|---|---|
| DE | 102005052481 A1 | 5/2007 |
| DE | 102008006179 A1 | 7/2009 |

(Continued)

*Primary Examiner* — Thomas Denion
*Assistant Examiner* — Jorge Leon, Jr.
(74) *Attorney, Agent, or Firm* — Glenn M. Massina, Esq.; Fox Rothschild LLP

(57) ABSTRACT

A control valve for controlling a pressure fluid, said control valve comprising: a valve housing (10) comprising a valve inlet (P) for the pressure fluid, a control port (A, B) for connecting to an assembly which is to be operated using the pressure fluid, and a valve outlet (TA, TB); a valve piston (20) which can be moved in the valve housing (10) along an axis (R) and which comprises a hollow space (21) through which the pressure fluid can flow from the valve inlet (P) to the control port (A, B); and a filter device (30) which is arranged in the control valve and comprises a filter cross-section (35) which filters the pressure fluid as it passes through it, wherein at least a part of the filter cross-section (35) of the filter device (30) is situated in the hollow space (21) of the valve piston (20).

31 Claims, 9 Drawing Sheets

(56) References Cited

U.S. PATENT DOCUMENTS

| | | |
|---|---|---|
| 7,487,752 B2 * | 2/2009 | Strauss et al. ............... 123/90.17 |
| 7,533,695 B2 | 5/2009 | Strauss et al. |
| 8,061,317 B2 | 11/2011 | Bohner et al. |
| 2007/0056540 A1 * | 3/2007 | Hoppe et al. ............... 123/90.17 |
| 2010/0294387 A1 * | 11/2010 | Scheidig et al. ......... 137/625.32 |
| 2011/0084018 A1 | 4/2011 | Hoppe et al. |
| 2011/0220046 A1 | 9/2011 | Welte et al. |
| 2011/0226204 A1 * | 9/2011 | Hoppe et al. ............... 123/90.17 |
| 2012/0055427 A1 * | 3/2012 | Chen et al. ................. 123/90.15 |
| 2012/0097122 A1 * | 4/2012 | Lichti ........................ 123/90.15 |

FOREIGN PATENT DOCUMENTS

| | | |
|---|---|---|
| DE | 102009048753 A1 | 4/2011 |
| DE | 102010002713 A1 | 9/2011 |
| DE | 102011004539 A1 | 8/2012 |
| EP | 1985813 A3 | 2/2010 |
| JP | 09280019 A | 10/1997 |

\* cited by examiner

CONTROL VALVE COMPRISING AN INTEGRATED FILTER AND CAM SHAFT PHASE SETTER COMPRISING SAID CONTROL VALVE

RELATED APPLICATION DATA

This application claims the priority of German patent application No. 10 2011 084 059.1, filed on Oct. 5, 2011, which is hereby incorporated in its entirety by reference.

FIELD OF THE INVENTION

The invention relates to a control valve comprising a filter device. The subject of the invention is the control valve in its own right and also in combination with a fluidic assembly which can be controlled or regulated by means of the control valve, for example a cam shaft phase setter or a pump which can be adjusted in terms of its delivery volume. The control valve can in particular be a constituent of a cam shaft phase setter, to be operated using pressure fluid, for adjusting the rotational angular position of a cam shaft relative to a crankshaft of a combustion engine. One particular aspect is an improvement with respect to the filter device for the pressure fluid.

BACKGROUND OF THE INVENTION

In order to increase the output and torque, but also to reduce the fuel consumption and exhaust emissions, of internal combustion engines for road vehicles, cam shaft phase setters for varying the inlet and also outlet control times have become widespread. Due to their high degree of reliability, but also in view of a favorable cost-benefit relationship, hydraulic phase setters which are operated using the lubricating oil for the combustion engine in accordance with the principle of the hydraulic pivoting motor have proven to be of value. Increased demands on fuel consumption and emissions require high setting speeds. A compact, space-saving design and a low price of the phase setter are also demanded. At the same time, faultless operation and a high degree of reliability are to be ensured.

The demands for a high setting speed and a compact design are met by phase setters comprising a central control valve. In order to ensure operational reliability while keeping the dimensions and the losses due to leaks as small as possible, the pressure fluid which serves to adjust the phase setter—in most applications, the lubricating oil for the combustion engine—is cleaned by means of filters upstream of the phase setter and as near to the phase setter as possible. With regard to operational reliability, arranging a blocking member, for example a reflux valve, in the pressure fluid feed of the phase setter and so preventing one or more setting chamber(s) of the phase setter from being able to be emptied in the direction of the upstream pressure fluid supply if a pressure burden prevails in the setting chamber or chambers as compared to a pressure fluid supply which feeds the pressure fluid is also known. Such a pressure burden can occur in a phase setter due to the drag moment of the cam shaft.

In accordance with JP 09-280019, a filter device is arranged immediately upstream of the phase setter in the pressure fluid feed to the phase setter within the cam shaft. A disadvantage of this solution is that mounting space has to be provided on the part of the cam shaft for the filter device, and the filter device has to be inserted into the cam shaft in an assembling step of its own.

DE 10 2005 052 481 A1 discloses a phase setter which comprises a central control valve comprising an integrated filter device and an integrated reflux valve. The control valve comprises a valve housing which is arranged axially in relation to the rotational axis of the cam shaft and which comprises a valve inlet, control ports and a radial valve outlet. A valve piston is accommodated, such that it can be moved axially, in the valve housing. In a first variant, the filter device is arranged in the valve inlet. The pressure fluid flows radially through the valve inlet and the filter device into the interior of the valve housing, where it flows axially onto the reflux valve and past the reflux valve in a radial direction into a channel which extends axially in the valve housing, from which it flows radially inwards to the outer circumference of the valve piston, via the outer circumference of the valve piston to one of the control ports and via the relevant control port to assigned setting chambers of the phase setter. Pressure fluid flowing off from other setting chambers is channeled via the other of the control ports into and through the valve piston to the valve outlet. In a second variant, the filter device is not arranged in the radial valve inlet but rather in an axial portion of the valve housing which is connected to it and upstream of the reflux valve. In both variants, there is either only a small filter cross-section available for cleaning the pressure fluid, or additional mounting space for arranging the filter device is required.

A filter device which cleans the pressure fluid in the radial feed is also known from DE 10 2009 048 753 A1, in which the filter device is formed as a filter ring which is to be assembled separately.

In order to reduce an increased risk of swarf associated with the filter device of DE 10 2005 052 481 A1, DE 10 2008 006 179 A1 proposes constructing the valve housing in three layers. A filter fabric surrounds an outer circumference of an inner guiding sleeve. Plastic is injection-molded around the outside of this two-layered sleeve body. The filter fabric extends axially through radial control ports of the three-layered valve housing. The size of the filter cross-section is also limited in this solution, since only the cross-section of the respective control port through which the pressure fluid flows on its way to the pressure chambers is available as the filter cross-section. The three-layered construction of the valve housing also increases the effort of manufacturing and the price of the control valve.

Phase setters comprising central control valves and reflux valves integrated in the control valves are also known from U.S. Pat. No. 6,971,353 B2 and U.S. Pat. No. 7,533,695 B2. U.S. Pat. No. 7,533,695 B2 mentions that a filter device can optionally also be integrated in the control valve.

SUMMARY OF THE INVENTION

It is an object of the invention to provide a control valve which comprises a filter device for cleaning the pressure fluid as an integrated constituent and which has an increased cleaning effect at a low throughflow resistance. The control valve is to be suitable for controlling or regulating an assembly which can be operated fluidically, preferably hydraulically, such as for example a cam shaft phase setter or a pump which can be regulated.

The control valve comprises a valve housing and a valve piston which can be moved along a movement axis, and in this sense axially, in the valve housing. The valve housing comprises a valve inlet, preferably an axial valve inlet, for the pressure fluid and at least one control port, preferably a number of control ports, as well as a valve outlet. The one or more control ports serve to connect the control valve to one or more setting chamber(s) of an assembly which can be operated fluidically, for example a fluidic setting member, which is to be controlled or regulated by means of the control valve. The fluidic assembly can in particular be a cam shaft phase setter. The control valve is not however restricted to such a preferred use, but rather can also serve to control or regulate another fluidically, preferably hydraulically operated assembly, for example a pump which can be adjusted in terms of its delivery volume, such as for example a lubricating oil pump for supplying a combustion engine of a motor vehicle or any vehicle in general or also a fixedly arranged combustion engine with lubricating oil. In addition, however, other applications in which an assembly is to be operated while controlled or regulated by means of a control valve are also conceivable.

The valve piston is hollow. It comprises an inner hollow space through which the pressure fluid can flow from the valve inlet, via a piston outlet comprising one or more apertures of the valve piston, to the control port or ports. It is conducive to a compact and therefore space-saving design of the valve which is nevertheless simple in design and to the demand for high setting speeds if the valve piston comprises a piston inlet which extends axially, preferably axially flush with the valve inlet which is preferably likewise axial. Control valves which are advantageous in this respect are for example disclosed in DE 10 2010 002 713 A1 and DE 10 2011 004 539 in connection with cam shaft phase setters. This design of the control valve—in particular, arranging the valve inlet and the piston inlet to be axially flush—is advantageously associated with low throttle losses as the fluid flows through the control valve, thus enabling the setting speed to be increased as compared to other valve designs.

An integrated constituent of the control valve is a filter device which is arranged in the control valve and exhibits a filter cross-section, wherein the pressure fluid is filtered as it flows through said filter cross-section. The filter cross-section is understood to be an area, more specifically a flow cross-section, through which the pressure fluid has to flow in order to pass from the valve inlet to the control ports by flowing through the filter device. The term "filter cross-section" is for example not understood to mean the surface of a filter material, for example a filter fabric, but rather a cross-sectional area and/or flow cross-section which the pressure fluid has to flow through and in which a filter material is arranged which cleans the pressure fluid as it flows through it and which exhibits an effective filter area which can be significantly larger than the cross-sectional area of the filter. If, for example, a cylindrical sleeve which is completely filled with filter material forms the filter device, and if the sleeve comprises an impermeable casing, such that pressure fluid only flows axially through the filter device formed in this way, the internal cross-sectional area of the casing is the filter cross-section. If, for example, a permeable filter fabric forms the casing, the entire circumferential area is a filter cross-section in the sense of the invention. The statements made with respect to a cam shaft phase setter also apply to other applications in which an assembly to be controlled or regulated comprises setting chambers which the control valve is or can be connected to via its control ports, of which there are preferably at least two.

In accordance with the invention, at least a part of the filter cross-section—preferably, at least a predominant part of the filter cross-section—is situated in the hollow space of the valve piston. This enables the hollow space of the piston which the pressure fluid is to flow through to be used for cleaning the pressure fluid. This design enables the filter cross-section to be increased in size as compared to the known solutions. The filter device does not require any additional mounting space or at most a negligibly small additional mounting space for supporting the filter device. In particular, a filter cross-section which is large as compared to the known solutions can be realized without increasing or without significantly increasing the axial length of the control valve. The pressure fluid which flows through the valve inlet into the control valve flows within the valve piston through the filter cross-section situated at least partially in the hollow space of the piston and through one or more apertures of the valve piston to the control ports of the valve housing and from there into the early setting chamber(s) or late setting chamber(s) in accordance with the switched state of the control valve. Another advantage associated with the invention is that the filter device is protectively accommodated.

In a preferred application, the control valve is a constituent of a phase setter for adjusting the rotational angular position of a cam shaft relative to a crankshaft of a combustion engine. The phase setter comprises a stator which can be rotary-driven by the crankshaft, a rotor which can be rotary-driven about a rotational axis by the stator, and a control valve. The stator can in particular be configured for a traction drive by the crankshaft, for example by means of a chain or a toothed belt, and can comprise a drive wheel for such embodiments, such as for example a sprocket or a toothed belt wheel or also a spur wheel for a rotary drive via a toothed wheel gear system. The rotor is or can be coupled to the cam shaft. It can in particular be connected, fixed in terms of torque, to the cam shaft and preferably arranged on an axially facing end of the cam shaft or configured to be connected, fixed in terms of torque, to the cam shaft. Connections which are fixed in terms of torque are understood by the invention to be connections which do not allow the components connected to each other in this way to rotate relative to each other, for example by forming the relative components in one piece or by joining them appropriately fixedly to each other. If the rotor and the cam shaft are connected, fixed in terms of torque, then the rotational axis of the cam shaft when the phase setter is assembled is also therefore the rotational axis of the rotor. The stator and the rotor together form setting chambers, namely at least one early setting chamber and at least one late setting chamber. The setting chambers can be charged with a pressure fluid, in order to be able to adjust the rotor relative to the stator about the rotational axis. Charging the early setting chamber(s) with pressure and relieving the late setting chamber(s) of pressure generates a torque which acts on the rotor relative to the stator in the leading direction. Charging the late setting chamber(s) with pressure and relieving the early setting chamber(s) of pressure generates a torque which acts on the rotor relative to the stator in the trailing direction. The control valve serves to control the pressure fluid. The control valve is in particular used to determine whether the early setting chamber(s) or late setting chamber(s) is/are charged with or relieved of the pressure fluid.

The control valve can for example be arranged near to the arrangement consisting of the rotor and the stator in an attachment housing or cover for the phase setter, as disclosed for example in EP 1 985 813 A2. It can however also be arranged retracted from the rotor-stator arrangement or arranged in its own right on the machine housing, for example on the cylinder head or cylinder head cover. Particularly preferably, however, the valve housing extends axially in the rotor. If, as is preferred, the control valve is a central valve, then the rotational axis of the rotor and the movement axis of the valve piston coincide. The valve housing comprises: a valve inlet, preferably an axial valve inlet, for the pressure fluid; control ports which are connected to the setting chambers; and a valve outlet. One of the at least two control ports is connected to the early setting chamber(s), and the other is connected to the late setting chamber(s). The pressure fluid which flows into the control valve via the valve inlet therefore passes via the respective control port to the assigned setting chamber(s) or, when pressure is relieved, passes from the respective setting chamber(s) to the valve outlet via the assigned control port.

In preferred embodiments, the filter device comprises a filter enclosing structure which extends in the hollow space of the valve piston and surrounds an internal space of the filter device, and a filter inlet into the internal space of the filter device. The filter cross-section forms at least a part, preferably at least a predominant part, of the enclosing area of the filter enclosing structure which surrounds the internal space of the filter device. The pressure fluid passes through the filter inlet into the internal space of the filter device and from the internal space of the filter device through the filter cross-section, i.e. the part of the enclosing area of the filter enclosing structure which is covered with filter material, to the control ports of the valve housing.

The filter enclosing structure can for example be bulged spheroidally, such as for example in the shape of a hemisphere, from the valve inlet away into the hollow space of the valve piston, but is more preferably elongated. It can be widened or more preferably tapered in one or more discrete increments, for example staggered, or also continuously, for example conically, parabolically or in some other way exhibiting a varying curvature, in the direction of a filter end which is placed in the hollow space of the valve piston. It can in particular comprise an axially extending casing, for example a circular-cylindrical casing, or a casing which is oval, polygonal or corrugated in cross-section and a base which is axially spaced from the filter inlet. The filter cross-section forms at least a part, preferably at least a predominant part, of the area of the base or a part, preferably at least a predominant part, of the area of the casing situated between the filter inlet and the base. The word "or" is understood here, as elsewhere, by the invention in its usual logical sense of "inclusive or", i.e. it encompasses both the meaning "either . . . or" and the meaning "and", unless it follows from the respectively specific context that only one of these two meanings is exclusively to be encompassed. In relation to the feature according to which the filter cross-section forms at least a part of the base or at least a part of the casing, this means that the filter cross-section forms at least a part of the base only but not of the casing in a first variant, at least a part of the casing only but not of the base in a second variant, and at least a part of the casing and at least a part of the base in a third variant. The second and third of these three variants are preferred, since the filter cross-section can be increased in size as compared to the first variant. As mentioned, the casing can be cylindrical or can be tapered towards the base. The internal cross-section can also vary in other ways in terms of its size or shape in the longitudinal direction. The base can exhibit a curvature and can in particular be curved outwards; in preferred simple embodiments, however, the base is at least substantially planar.

The filter inlet is preferably formed by an axial filter opening, such that the pressure fluid can flow axially into the filter device and—in the preferred embodiments—into the internal space of the filter device which the filter enclosing structure surrounds. The filter opening and/or filter inlet can in particular be arranged at an axial end of the filter device. In order to realize a filter device which exhibits as little flow resistance as possible, an axially extending filter enclosing structure can be open at its upstream axial end over its entire or almost its entire axially facing area, forming the filter inlet, such that the entire upstream internal cross-section of the filter enclosing structure is available as the filter inlet.

The valve inlet, the filter inlet and the piston inlet are particularly preferably arranged such that they are axially flush. Such an embodiment helps to keep the flow resistance of the flow portion which extends from the valve inlet to the filter cross-section as low as possible. If, as is preferred, the control valve is a constituent of a cam shaft phase setter, and if the valve housing also extends axially in the rotor of the phase setter, as is likewise preferred, then the valve inlet, the filter inlet and the piston inlet are preferably arranged on the rotational axis of the rotor.

If, as is preferred, the valve piston can be moved counter to the restoring force of a valve spring, the valve spring can be supported on the filter device or can be supported via the filter device on either the valve housing or the valve piston. The filter device can comprise a supporting structure for supporting the valve spring or itself on the valve housing or valve piston. In preferred simple embodiments, the valve spring is functionally a pressure spring which, in order to generate the spring force which acts axially on the valve piston, is supported at one end on the valve piston and at the other end on the supporting structure of the filter device.

In preferred first embodiments, the filter device is supported on the valve housing and protrudes from the support into the valve piston. In second embodiments, the filter device is supported on the valve piston, such that it is slaved in the axial movements of the valve piston. In the second embodiments, it can protrude into the internal space of the valve piston as viewed from its support on the valve piston if it is supported on the piston outside of the hollow space. It can instead however also be supported in the hollow space of the valve piston, such that in such variants, it extends completely in the internal space of the valve piston. If the filter device is not supported on the valve piston but in some other way, in particular on the valve housing as in the first embodiments, then preferably at least a predominant part of the axial length of the filter device protrudes into the internal space of the filter piston.

Supporting the filter device on for example the valve housing, as is preferred, instead of on the valve piston has the advantage that the throughflow resistance which has to be overcome by the filter device as the fluid flows through the filter cross-section does not exert an axial force on the piston. In the second embodiments in which the filter device is supported on the valve piston, the pressure fluid generates an axial force as it flows through the filter device, wherein said axial force acts on the valve piston and is dependent on the magnitude of the throughflow resistance of the filter device. This axial force can be compensated for outside of the filter device, for example in a continuation of the teaching in DE 10 2010 002 713 A1 by correspondingly dimensioning an axially facing area of the piston which can be charged with the pressure fluid. In advantageous embodiments, the axial force which is associated with the flow resistance is at least partially compensated for by the filter device itself. In such embodiments, the filter device can comprise a seal which projects outwards towards a circumferential internal area of the valve piston and subdivides the hollow space of the valve piston into a first partial space which is connected to the control ports and a second partial space which is separated from the control ports by the seal. A part of the filter cross-section is also arranged such that a part of the pressure fluid which flows through the filter device flows into the second partial space and a pressure which is set in the second partial space as the pressure fluid flows through the filter device acts on the seal and thus on the filter device. The pressure acting in the second partial space generates an axial force via the seal, wherein said axial force acts on the filter device, opposes the axial force generated by the throughflow resistance of the filter device and at least partially compensates for it. Pressure fluid can also be pressed out of the second partial space, back into the filter device. This backflow effect can cause the filter device to be cleaned. While the pressure fluid which passes into the second partial space does preferably have to flow through a part of the filter cross-section, as described, it is however also in principle possible to compensate for the axial force by means of the seal, if the pressure fluid passes into the second partial space through a simple passage of the filter device, i.e. unfiltered. Preferably, however, this part of the pressure fluid is also cleaned by means of the filter device which comprises said part of the filter cross-section in the flow path to the second partial space for this purpose.

The filter cross-section can be formed by a fabric, mesh or fleece. An open-pored foam material or an open-pored sintered material is also a suitable filter material for forming the filter cross-section. The filter cross-section can be formed by the same filter material to the same thickness throughout or to a varying thickness. It is in principle also conceivable for the filter cross-section to be formed by a combination of different filter materials, for example from a combination of two, three or even more of the different filter materials mentioned. It is possible to realize different filter mechanisms such as for example surface filtration by means of a filter fabric or instead—or additionally—deep-bed filtration by means of a filter fleece. The filter cross-section is expediently formed such that particles contained in the pressure fluid which exhibit a size of 200 µm or more are retained by the filter device. The filter cross-section is preferably formed such that particles which exhibit particles sizes below 200 µm are also retained. Separating off particles which exhibit a particle size of 80 µm or more is preferred. When choosing a filter fabric or filter mesh, the mesh size of such a filter material can correspondingly be 200 µm or less in preferred embodiments. A mesh size of 100 to 180 µm is a good compromise between maximally fine separating and the robustness of the filter device.

In order to ensure the functioning of the assembly which is to be controlled or regulated by means of the control valve, for example a phase setter, even for the hypothetical scenario in which a blockage of the filter device is caused by gradual soiling, the valve piston or preferably the filter device can be fitted with a bursting structure or a bypass device which opens without being destroyed, such as for example a flap or other type of reflux valve. If a maximum pressure—which is predetermined by the bursting structure or by the bypass device which is closed up until this state is reached—is exceeded, then the bursting structure ruptures or bursts or the bypass device opens, such that the pressure fluid can pass around the filter cross-section, i.e. bypassing it, to the control ports.

In developments, the control valve comprises not only the filter device as an integrated constituent but also a blocking member which can in particular be formed as a simple reflux valve. The blocking member serves to prevent the pressure fluid from flowing back from one of the control ports—or, in corresponding designs of the valve, the one control port—to and through the valve inlet. The blocking member is preferably arranged on the flow path of the pressure fluid between the valve inlet and the filter device, i.e. the filter device is arranged downstream of the blocking member. The blocking member can comprise a blocking body, a blocking body seat and a spring which presses the blocking body into the blocking body seat with its spring force. The blocking member is preferably arranged in the region of the valve inlet. An aperture of the blocking member which is surrounded by the blocking body seat can in particular be formed directly by the valve housing, such that the number of parts required in order to realize the blocking member can be reduced and the installation of these parts simplified. In the preferred embodiments, the blocking member is accommodated in a hollow space of the valve housing. The spring of the blocking member can be supported directly on the valve housing or also on a supporting structure which is supported on and preferably inserted into the valve housing. The blocking member and the filter device can advantageously be arranged in axial succession, in particular axially flush, in order to keep the flow resistance low.

The filter device and the blocking member can be supported separately from each other. In other embodiments, they can however also directly abut each other axially, such that the blocking member is axially supported on the supporting structure of the filter device or the filter device is axially supported on the supporting structure of the blocking member. One of the supporting structures can then be joined to the valve housing, such that it cannot be moved axially, in an internal space of the valve housing, and the other supporting structure can be pressed axially against the joined supporting structure by means of a spring force; the supporting structure of the filter device can for example be pressed against a supporting structure of the blocking member by the spring force of the valve spring which acts on the valve piston. Embodiments in which the supporting structures are fixedly connected to each other in a material fit, a force fit or a positive fit, for example by means of a welded connection, adhesive connection, locking connection or a clamping or pressing connection, are however preferred to a loose pressure contact between the supporting structures. The two supporting structures can also be formed by a part which is formed as a unit. Combining the two supporting structures to form a joined unit or a unit which is formed in one part from the outset reduces the number of parts and simplifies incorporating them into the control valve.

The supporting structure of the filter device can have a dual function and form the supporting structure of the blocking member. The supporting structure of the filter device can support the spring mentioned above in connection with the blocking body or can form a guide for the blocking body.

The degree of integration can be further increased by arranging the filter device and the blocking member at almost the same location or by combining them in a mounting unit. The blocking member can then for example be arranged in the filter enclosing structure mentioned. The blocking member can also overlap the outside of the filter enclosing structure, completely or only in regions, and is formed downstream of the filter device in such variants. The filter cross-section can thus for example be overlapped by an impermeable blocking structure of the blocking member which comprises one or more tongue-like blocking element(s) which can be respectively bent away from the filter enclosing structure, counter to an elastic restoring force, wherein the blocking element(s) is/are bent away and the filter cross-section accordingly exposed by the pressure fluid. The flexible tongue-like surface region(s) and/or blocking element(s) of the blocking structure of the blocking member can respectively be formed in the manner of a Reed valve and act correspondingly. Arranging the blocking member in the filter device or overlapping its outside can be associated with an integrated and/or combined design of the filter device and blocking member; the blocking member can however also be embodied as a separate component in such embodiments.

The present application is directed to an integrated filter device. It should however be noted that other concepts within the invention which are described in connection with this concept within the invention can also be advantageously employed without this underlying concept. In relation to the arrangement or design of the blocking member, the Applicant for example reserves the right to direct a separate application to a control valve for controlling a pressure fluid, which comprises: a valve housing (10) comprising a valve inlet (P) for the pressure fluid, a control port (A, B) for connecting to an assembly which is to be operated using the pressure fluid, and a valve outlet (TA, TB); and a valve piston (20) which can be moved in the valve housing (10) along an axis (R) and which comprises a hollow space (21) through which the pressure fluid can flow from the valve inlet (P) to the control port (A, B). The Applicant also for example reserves the right to direct a separate application to a control valve for controlling a pressure fluid, which comprises: a valve housing (10) comprising a valve inlet (P) for the pressure fluid, a control port (A, B) for connecting to an assembly which is to be operated using the pressure fluid, and a valve outlet (TA, TB); a valve piston (20) which can be moved in the valve housing (10) along an axis (R) and which comprises a hollow space (21) through which the pressure fluid can flow from the valve inlet (P) to the control port (A, B); and a filter device (30) which is arranged in the control valve and comprises a filter cross-section (35) which filters the pressure fluid as it passes through it. A filter device as an integrated constituent of the control valve—preferably, a filter device (30) which is arranged in the control valve and comprises a filter cross-section (35) which filters the pressure fluid as it passes through it, wherein at least a part of the filter cross-section (35) of the filter device (30) is situated in the hollow space (21) of the valve piston (20)—is an optional but preferred development of a control valve comprising an integrated blocking member.

A control valve for controlling a pressure fluid, which comprises: a valve housing (10) comprising a valve inlet (P) for the pressure fluid, a control port (A, B) for connecting to an assembly which is to be operated using the pressure fluid, and a valve outlet (TA, TB); and a valve piston (20) which can be moved in the valve housing (10) along an axis (R) and which comprises a hollow space (21) through which the pressure fluid can flow from the valve inlet (P) to the control port (A, B), and which only optionally comprises a filter device (30) which is arranged in the control valve and comprises a filter cross-section (35) which filters the pressure fluid as it passes through it, wherein at least a part of the filter cross-section (35) of the filter device (30) is situated in the hollow space (21) of the valve piston (20), can for example comprise the bursting structure or bypass device mentioned or a filter device comprising plastically deformable contact elements. A control valve for controlling a pressure fluid, which comprises: a valve housing (10) comprising a valve inlet (P) for the pressure fluid, a control port (A, B) for connecting to an assembly which is to be operated using the pressure fluid, and a valve outlet (TA, TB); a valve piston (20) which can be moved in the valve housing (10) along an axis (R) and which comprises a hollow space (21) through which the pressure fluid can flow from the valve inlet (P) to the control port (A, B); and a filter device (30) which is arranged in the control valve and comprises a filter cross-section (35) which filters the pressure fluid as it passes through it, and in which only optionally at least a part of the filter crosssection (35) of the filter device (30) is situated in the hollow space (21) of the valve piston (20), can likewise for example comprise the bursting structure or bypass device mentioned or a filter device comprising plastically deformable contact elements.

BRIEF DESCRIPTION OF THE DRAWINGS

Example embodiments of the invention are described below on the basis of figures. Features disclosed by the example embodiments, each individually and in any combination of features, advantageously develop the subjects of the claims and the embodiments described above.

DETAILED DESCRIPTION

Figure 1:
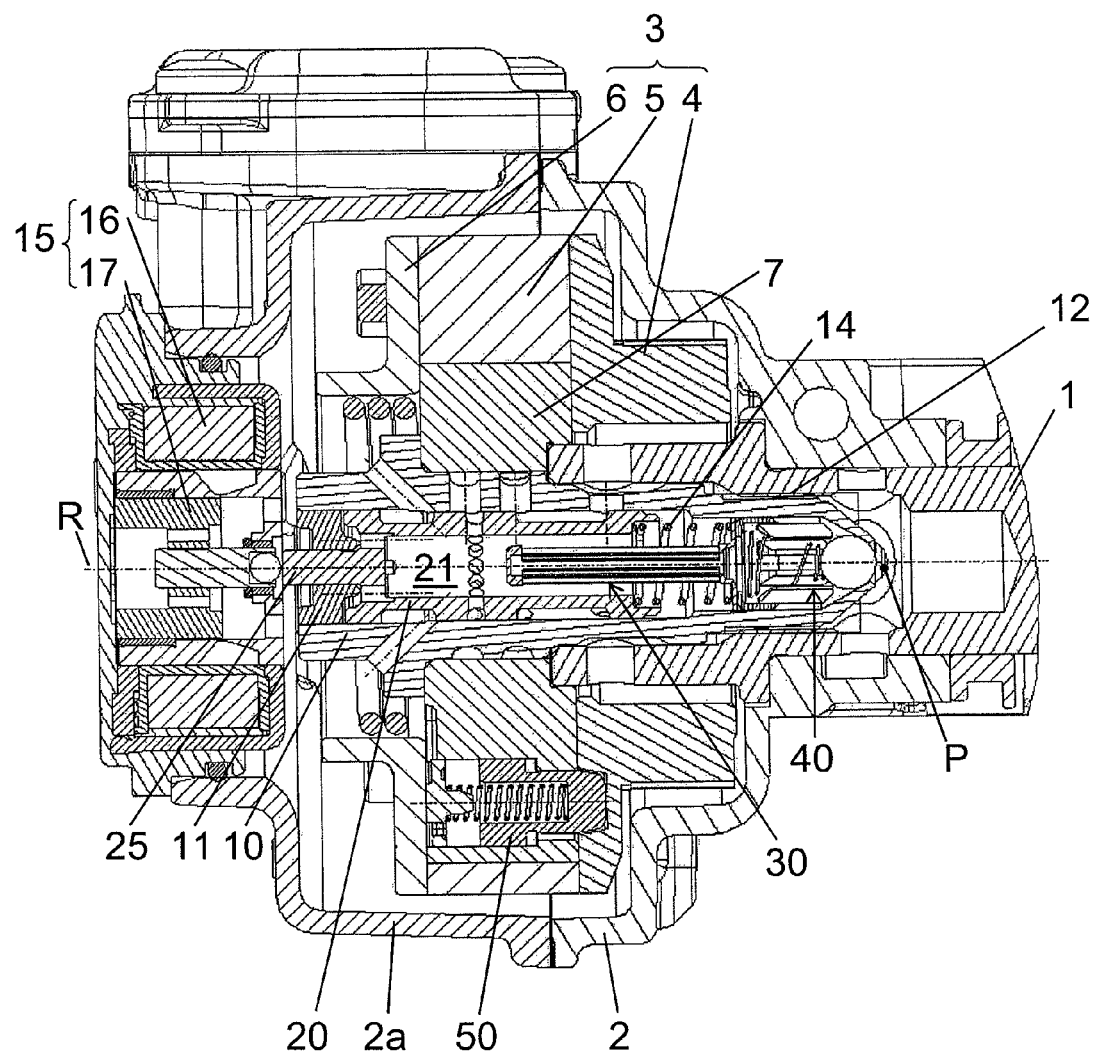
FIG. 1 shows an assembled cam shaft phase setter comprising a stator, a rotor and a control valve, in a first example embodiment.

FIG. 1 shows a cam shaft phase setter in a longitudinal section. The cam shaft phase setter is arranged at an axially facing end of a cam shaft 1 and serves to adjust the phase position, i.e. the rotational angular position of the cam shaft 1 relative to a crankshaft of a combustion engine, for example a drive motor of a motor vehicle. The cam shaft 1 is mounted on a machine housing 2 of the combustion engine such that it can be rotated about a rotational axis R and is for example mounted on a cylinder head and covered by a cylinder head cover.

The cam shaft phase setter comprises a stator 3 which can be rotary-driven by the crankshaft, and a rotor 7 which can be non-rotationally connected to the cam shaft 1. The stator 3 is composed of a drive wheel 4, for example a sprocket, a cover 6 and an impeller 5 which is arranged axially between the drive wheel 4 and the cover 6. The drive wheel 4, the impeller 5 and the cover 6 are non-rotationally connected to each other. The assembly of the stator 3 is merely an example. The stator 3 can alternatively also be joined from more parts or, instead of the three parts 4, 5 and 6, can also be joined from only two parts, for example from an integrated part 4, 5 and the part 6 or from the part 4 and an integrated part 5, 6. It can in principle also be originally formed in one piece. The drive wheel 4 can be formed circumferentially on the outside of the impeller 5, and the cover region of the drive wheel 4, which laterally seals off the stator-rotor arrangement, can be a constituent of the rotor 7. In addition to or instead of the cover region formed by the drive wheel 4, the cover 6 can be a constituent of the rotor 7. The stator 3 and the rotor 7 form a hydraulic pivoting motor in accordance with the vane cell principle.

The cam shaft phase setter comprises a control valve which is arranged centrally in relation to the stator-rotor arrangement 3, 7 and which comprises a valve housing 10 and a valve piston 20 which is arranged in the valve housing 10 such that it can be axially adjusted back and forth. The valve housing 10 comprises a connecting portion 12 in which it is fixedly connected to the cam shaft 1. As is preferred, but merely by way of example, the valve housing 10 protrudes into a receptacle formed at the axially facing end of the cam shaft 1 and is screwed to the cam shaft in the receptacle, i.e. the connecting portion 12 is an external thread. The valve housing 10 therefore has a dual function and also serves as a central fastening means for the connection, fixed in terms of torque, between the cam shaft 1 and the rotor 7, by pressing the rotor 7 against the axially facing side of the cam shaft 1 when assembled and after the joining connection—in the example, a screw connection—has been established.

Figure 2:
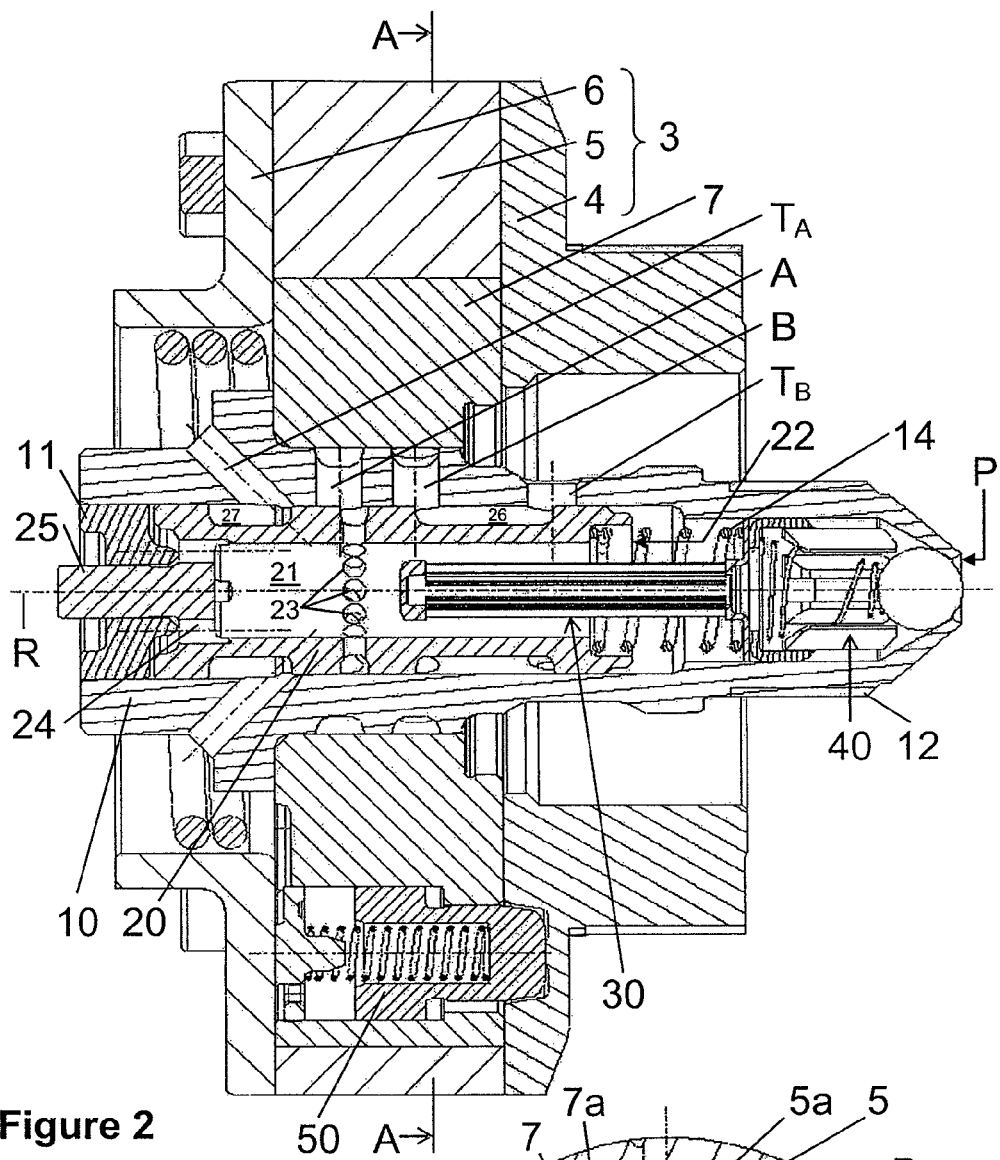
FIG. 2 shows an assembly unit comprising the stator, rotor and control valve of the first example embodiment.

FIG. 2 shows the phase setter before it has been assembled and without the cover 2a which accommodates the setting member 15. The assembly unit depicted in FIG. 2 which comprises the stator 3, the rotor 7 and the control valve can be assembled on the cam shaft 1 simply by establishing the joining connection—in the example, the screw connection—between the cam shaft 1 and the connecting portion 12 of the valve housing 10.

Figure 3:
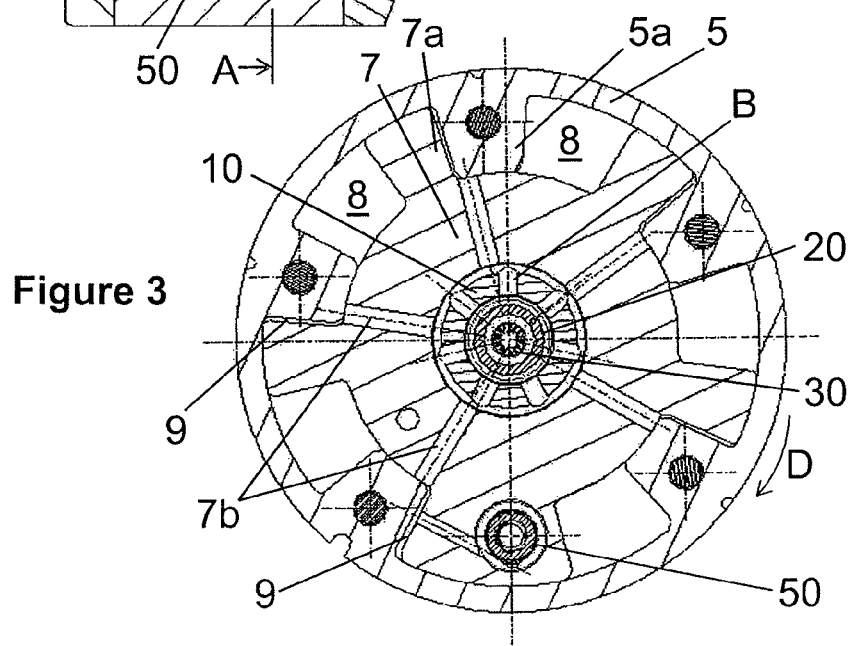
FIG. 3 shows the assembly unit in a cross-section A-A.

FIG. 3 shows the assembly unit in the cross-section A-A from FIG. 2. The impeller 5 forms an external component of the pivoting motor, and the rotor 7 forms an internal component of the pivoting motor. The inner circumference of the hollow impeller 5 comprises vanes 5a which project radially inwards. The rotor 7 comprises vanes 7a which project radially outwards and form first setting chambers 8 and second setting chambers 9 with the vanes 5a of the stator 3. The setting chambers 8 are respectively arranged on one side of the vanes 7a of the rotor 7 in the circumferential direction, and the setting chambers 9 are respectively arranged on the other side of the vanes 7a of the rotor 7 in the circumferential direction. If the setting chambers 8 are pressurized and the setting chambers 9 are relieved, the rotor 7 rotates relative to the stator 3 and/or impeller 5, clockwise in FIG. 3, at most up to the end position assumed in FIG. 3. If the setting chambers 9 are pressurized and the setting chambers 8 are relieved of pressure, the rotor 7 rotates anti-clockwise relative to the stator 3. The rotational movement relative to the stator 3 in one rotational direction corresponds to the cam shaft 1 leading relative to the crankshaft, and the relative rotational movement in the other direction corresponds to the cam shaft 1 trailing relative to the crankshaft.

In the example embodiment, it is assumed that the stator 3 is driven in the rotational direction D. The setting chambers 8 are therefore early setting chambers and the setting chambers 9 are late setting chambers. In FIG. 3, the rotor 7 assumes the early setting relative to the stator 3, in which the cam shaft 1 leads relative to the crankshaft. If the late setting chambers 9 are charged with the pressure fluid and the early setting chambers 8 are relieved, the rotor 7 rotates in the trailing direction, at most up to a late setting. In the early setting, the rotor 7 is latched by means of a latching pin 50. The pin 50 can be moved from its latched position into a releasing position by charging it with pressure, in order to be able to move the rotor 7 in the direction of late setting. It is fluidically connected to the nearest late setting chamber 9 for this purpose. Aside from the fact of charging the pin from one of the late setting chambers 9, the latching mechanism comprising the latching pin 50 corresponds to that of DE 10 2011 004 539. The early setting and the late setting are each predetermined by an abutting contact. In the two end settings or extreme settings, at least one of the rotor vanes 7a is respectively in an abutting contact with one of the stator vanes 5a. In preferred embodiments, the rotor 7 can not only be rotationally adjusted back and forth relative to the stator 3 between these two rotational angular end positions but rather can be hydraulically fixed in any intermediate position by correspondingly charging both the early setting chambers 8 and the late setting chambers 9 with pressure.

Figure 4:
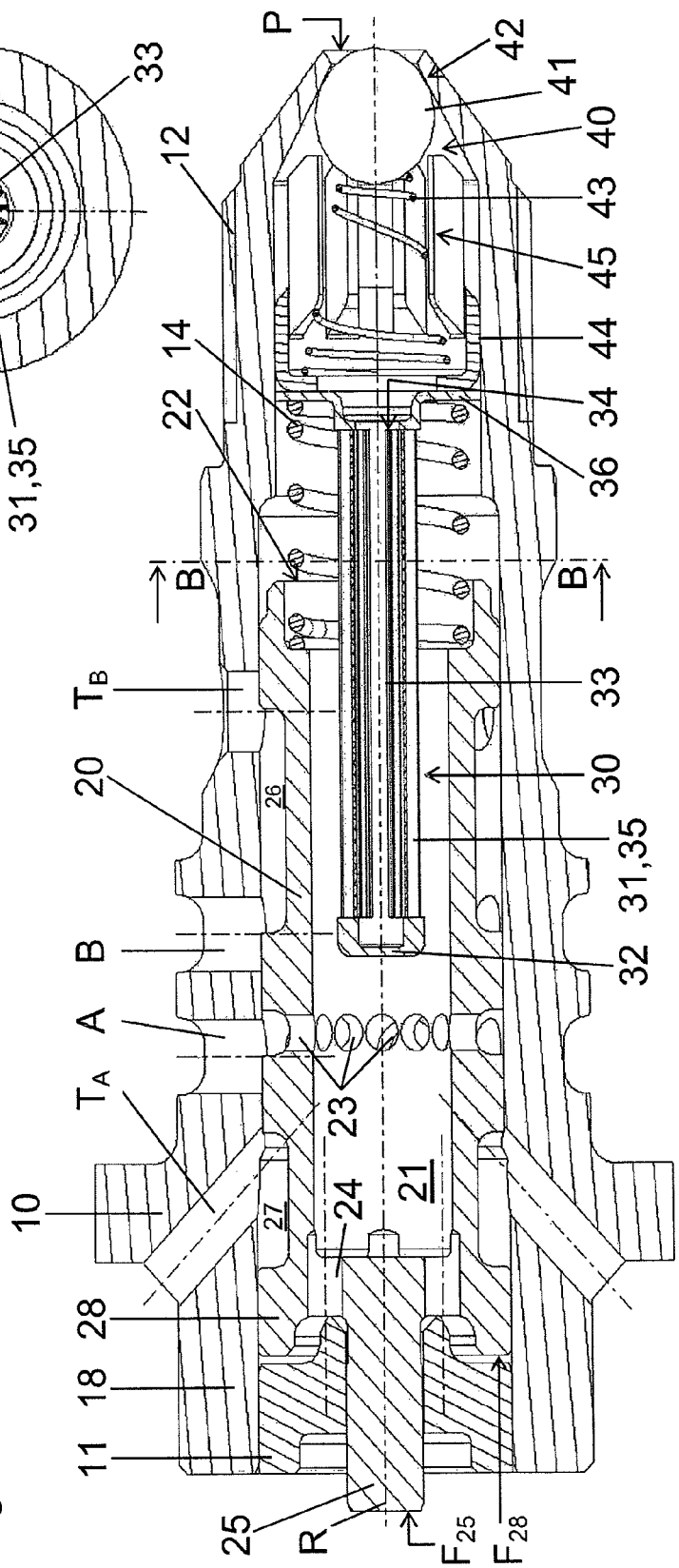
FIG. 4 shows the control valve of the first example embodiment.

FIG. 4 shows the valve housing 10 together with the valve piston 20 and other integrated components of the control valve, isolated from the assembly unit, i.e. detached from the stator-rotor arrangement 3, 7. The integrated components and/or constituents of the control valve are a filter device 30 and a blocking member 40 which together with the valve housing 10 and the valve piston 20 form a mounting unit of their own which can be pushed through a central passage of the rotor 7 as a pre-assembled unit, in order to form the assembly unit of FIG. 2.

The valve piston 20 is hollow and comprises an axially extending hollow space 21 which is open at one axial end of the valve piston 20, where it forms an axial piston inlet 22. The valve piston 20 also comprises a piston outlet 23 which leads radially through a casing of the valve piston 20 which surrounds the hollow space 21. The other axial end of the valve piston 20, which faces away from the piston inlet 22, comprises a coupling member 25 for coupling to a setting member 15 (FIG. 1) which axially adjusts the valve piston 20. The coupling member 25 acts as an operating plunger of the valve piston 20. The coupling member 25 can be formed in one piece with the piston casing which surrounds the hollow space 21 or as applicable can be joined, axially fixed, to it. It projects on the axially facing end of the valve piston 20 which axially faces the setting member 15. The coupling member 25 protrudes through an axially facing closure wall 11 of the valve housing 10. The axially facing closure wall 11 surrounds the coupling member 25 in a tight fit and thus ensures a fluid-proof closure of the valve housing 10 despite the coupling member 25 being able to move back and forth.

The setting member 15 (FIG. 1) is an electromagnetic setting member—in the example embodiment, an axial stroke electromagnet—comprising a coil 16 through which current can be passed and an anchor 17. The coil 16 is non-rotationally connected to the machine housing 2 of the combustion engine. In the example embodiment, the coil 16 is non-rotationally connected to a cover 2a which is assembled on the machine housing 2. The anchor 17 can be axially moved relative to the coil 16. The anchor 17 and the coupling member 25 are directly in a coupling engagement which is formed as an axial pressure contact. When current is passed through the coil 16, a setting force which is directed axially towards the coupling member 25 acts on the anchor 17 and—in the coupling engagement which is solely an axial pressure contact—on the coupling member 25 and therefore on the valve piston 20. Preferably, only a point contact prevails at the separation point between the valve piston 20, which rotates with the cam shaft 1 during operation, and the setting member 15 which does not rotate. The end of the anchor 17 which contacts the coupling member 25 preferably exhibits a spherical surface. Alternatively, the axially facing end of the coupling member 25 could exhibit a spherical surface. In one development, the contact end of the anchor 17 is formed as a spherical slide bearing, by mounting a sphere at the contact end in a socket of the anchor 17, such that it can be freely and spherically rotated.

The control valve comprises a valve spring 14, the spring force of which opposes the setting force of the setting member 15. The valve spring 14 is supported on the valve housing 10 and supported in the direction of the setting member 15 on the valve piston 20. The setting member 15 is actuated, i.e. current is passed through it, by a controller of the combustion engine. It is preferably actuated using a characteristic diagram which is stored in a memory of the machine controller, for example as a function of the rotational speed of the crankshaft, the load or other parameters which are relevant to the operation of the combustion engine.

The valve piston 20 is arranged in a central axial hollow space of the valve housing 10, such that it can be moved back and forth in the way described. Its axial end which faces away from the setting member 15 comprises a valve inlet P which leads axially and centrally into the hollow space of the housing and to which pressurized fluid can be fed via the cam shaft 1. The fluid can in particular be a lubricating oil which serves to lubricate the combustion engine and also to lubricate for example the pivot bearing of the cam shaft 1 (FIG. 1), such that the valve inlet P is connected to the lubricating oil supply of the cam shaft 1. This pressure fluid flows through the axial valve inlet P into the valve housing 10 and through the piston inlet 22, which is axially flush with the valve inlet P, into the hollow space 21. The piston outlet 23 branches laterally off from the hollow space 21, for example in a radial direction as is preferred, and the pressure fluid is fed through the piston outlet 23 to either the early setting chambers 8 or the late setting chambers 9, depending on the axial position of the valve piston 20, in order to set the phase position of the rotor 7 relative to the stator 3 and therefore the phase position of the cam shaft 1 relative to the crankshaft. The piston outlet 23 is formed by radial passages through the casing of the valve piston 20 which are arranged in a distribution over the circumference of the valve piston 20. The piston outlet 23 is arranged in an axially middle portion of the valve piston 20.

The valve housing 10 comprises ports, which lead through its casing, for feeding and draining the fluid to and from the setting chambers 8 and 9, namely a control port A, a control port B and valve outlets TA and TB. The ports A and B and the outlets TA and TB are linear passages through the casing of the valve housing 10. The control ports A and B extend, as is preferred but merely by way of example, radially through the casing by the shortest path.

FIGS. 1 and 2 show the valve piston 20 in a first axial piston position in which it is held by the valve spring 14. In the first piston position, the piston outlet 23 is connected to the control port A. The pressure fluid which is fed via the valve inlet P flows in the axial direction through the axial piston inlet 22 into the hollow space 21 of the valve piston 20 and from there through the branching piston outlet 23 to the setting chambers 8 which are assigned to the control port A. The setting chambers 9 are connected to a reservoir via the control port B and a valve outlet TB and are therefore relieved of pressure.

A recess 26 extends circumferentially 360° over the outer circumference of the valve piston 20 and connects the control port B to the valve outlet TB in the first piston position. Behind the piston outlet 23, as viewed in the axial direction from the recess 26, another axially extending recess 27 is formed on the outer circumference of the valve piston 20 and likewise extends circumferentially over the outer circumference of the valve piston 20. The recess 27 is connected to the valve outlet TA in the first piston position. The valve outlet TA is assigned to the control port A. However, it is fluidically separated from the control port A in the first piston position by a sealing stay of the valve piston 20 which is formed between the piston outlet 23 and the recess 27.

If the anchor 17 is charged with a setting force which exceeds the spring force of the valve spring 14 by correspondingly passing current through the setting member 15, the setting member 15 pushes the valve piston 20 out of the first piston position shown, axially towards the valve inlet P and, if the setting force is correspondingly large, up to an axially second piston position in which it is no longer the control port A but rather the other control port B which is connected to the piston outlet 23. In the second piston position, a sealing stay of the valve piston 20 which is formed between the piston outlet 23 and the recess 26 separates the control port B from its assigned valve outlet TB, such that in the second piston position, the setting chambers 9 are charged with the pressure fluid. In the second piston position, the recess 27 also connects the control port A to the valve outlet TA, such that the fluid can flow off from the setting chambers 8 and the setting chambers 8 are relieved of pressure. The rotor 7 is correspondingly moved, anti-clockwise in the representation in FIG. 3, relative to the impeller 5 and therefore relative to the stator 3 in the direction of late setting. The cam shaft 1 which is non-rotationally connected to the rotor 7 is adjusted in terms of its phase position relative to the crankshaft by the same rotational angle.

The fluid of the high-pressure side which flows through the valve inlet P into the control valve charges the valve piston 20 with a first axial force which acts in the direction of the setting member 15. In order to compensate for this first axial force, fluid can flow through the valve piston 20 towards the setting member 15, such that a fluid pressure builds up on its rear side which faces the setting member 15, between said rear side and the axially facing closure wall 11, wherein said fluid pressure exerts a counterforce—a second axial force—on the rear side of the valve piston 20. Since the projection area which can be charged with the pressure fluid is reduced by the cross-sectional area F25 over which the coupling member 25 protrudes through the axially facing closure wall 11, the axial counterforce—the second axial force—would be smaller than the first axial force, in accordance with the cross-sectional area F25 of the coupling member 25. A resultant axial thrust would arise which would vary as a function of the pressure of the fluid in accordance with the difference between the projection areas. The characteristic curve of the control valve would correspondingly vary, which can lead to significant distortions, since the pressure of the fluid can fluctuate while the combustion engine is in operation.

In order to increase the second axial force, the valve piston 20 comprises a radially widened piston portion 28, referred to in the following as the widening 28, and the valve housing 10 comprises a complementarily widened housing portion 18 which surrounds the widening 28 in a tight fit. Providing the valve housing 10 and the valve piston 20 cooperate in a seal, the valve piston 20 exhibits by way of example the same cylindrical cross-section on the whole of its outer circumference, with the exception of the widening 28. In order to guide the pressure fluid onto the rear side of the valve piston 20, the valve piston 20 comprises a feed 24—axially behind the piston outlet 23 as viewed from the piston inlet 22—which is formed by a number of passage channels in a base of the valve piston 20 which are distributed around the central axis R. The widening 28 and correspondingly the housing portion 18 are dimensioned such that the increase in the projection area F28 facing the setting member 15 which is provided by the widening 28 at least predominantly equalizes the cross-sectional area F25 of the coupling member 25 which is "lost" to compensating. The compensating area is an outer annular area of the projection area F28. With regard to compensating for the axial force, the control valve can correspond to the control valve of DE 10 2010 002 713 A1 and in particular to the embodiments claimed in DE 10 2010 002 713 A1.

The filter device 30 extends axially over a part of its length in the valve piston 20. It informed as a hollow structure, i.e. as a filter enclosing structure or filter bag and/or filter cage, in order to obtain a filter cross-section 35 which cleans the pressure fluid flowing through it. The filter enclosing structure consists of a casing 31, which is cylindrical in the first example embodiment, and a base 32 which forms an axial end of the filter enclosing structure which lies in the hollow space 21 of the valve piston 20. The end of the casing 31, which is upstream in relation to the inflowing pressure fluid, is open such that a filter inlet 34 is formed at said end over at least substantially the entire internal cross-section of the casing 31. The casing 31 surrounds an internal space 33 of the filter device between the base 32 and the filter inlet 34. The filter device 30 comprises a bearing structure which forms the base 32 and a supporting structure 36 in one piece. The bearing structure can for example be formed from a plastic material or a metallic material. A filter material which the pressure fluid can flow through and which retains dirt particles when the pressure fluid flows through it and thus cleans the pressure fluid forms almost the entire circumference of the casing 31. It is only interrupted by lateral connecting stays of the bearing structure which connect the base 32 to the supporting structure 36. The filter material is held by the bearing structure. The base 32 is impermeable.

Figure 5:
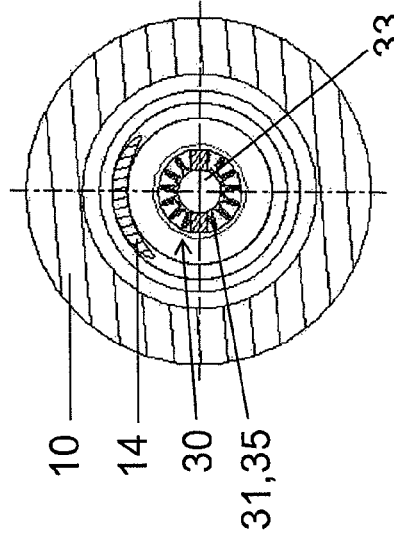
FIG. 5 shows the control valve of the first example embodiment, in a cross-section B-B.

FIG. 5 shows the control valve in a cross-section B-B which is indicated in FIG. 4. The casing 31 is corrugated in cross-section as viewed in the circumferential direction, thus providing a particularly large filter cross-section which exhibits the shape of a multiply serrated or corrugated star in cross-section, as can be seen in FIG. 5. The filter material is pleated in order to obtain a particularly good filter action. A filter material which is planar in cross-section or only bent once, such as for example a filter material which is arranged in the shape of a simple ring or partial ring in cross-section, would be more cost-effective.

The filter cross-section 35 is formed by the area of the filter enclosing structure 31, 32 which the pressure fluid flowing in through the filter inlet 34 flows through before it reaches the piston outlet 23, and which is covered with a filter material which is suitable for cleaning the pressure fluid. If, for example, the filter enclosing structure comprises a circular-cylindrical casing 31 and a planar base 32 which each consist entirely of filter material, then the circular-cylindrical circumferential area and the circular base area together form the filter cross-section 35. If the walls are thin, it is irrelevant whether the area over the inner or the outer circumference of the casing 31 is understood to be the filter cross-section 35. If the walls are thick, a middle area between the inner and outer circumference can alternatively be understood to be the filter cross-section 35. In the first example embodiment, the filter cross-section 35 is significantly larger due to the corrugated casing 31 consisting of filter material and corresponds to the area of the casing 31 if drawn out into a planar area.

The filter device 30 is supported on the valve housing 10 via the supporting structure 36 and thus in particular axially fixed. The supporting structure 36 protrudes outwards beyond the casing 31 at the upstream end, simply in the shape of a flange in the example, and surrounds the filter inlet 34. The filter device 30 thus as a whole exhibits the shape of an elongated cylindrical cap but with a corrugated casing 31.

The valve spring 14 is axially clamped between the valve piston 20 and the supporting structure 36 and is axially supported on the supporting structure 36 of the filter device 30. The other end of the spring acts axially on the valve piston 20.

The blocking member 40 is arranged upstream of the filter device 30, likewise still in the valve housing 10. It is formed as a reflux valve and comprises a spherical blocking body 41, a blocking body seat 42, a spring 43 and a supporting structure 44 for supporting it and the spring 43. The supporting structure 44 is joined to the valve housing 10 such that it cannot be moved axially and preferably such that it cannot be moved at all. It can in particular be pressed into a bore or an otherwise formed, axially extending hollow space of the valve housing 10. The supporting structure 36 of the filter device 30 is axially supported on the supporting structure 44 of the blocking member 40. The support can in principle be a loose axial pressure contact, if the valve spring 14 exerts a sufficiently large axial force on the supporting structure 36; more preferably, however, the supporting structures 36 and 44 are fixedly joined to each other, such that the filter device 30 and the supporting structure 44 form an assembly unit which can be inserted completely into the valve housing 10. The blocking body 41 is axially guided by a guide 45. The guide 45 is formed on the supporting structure 44.

In one modification, the biasing force of the valve spring 14 can be set when assembling the filter device 30 by fine-adjusting the axial position of the supporting structures 36 and 44. In the modification, an axial appendage can project from the supporting structures 36 and 44 towards the valve piston 20, such that when the valve piston 20 is inserted, it presses against the appendage and shifts the supporting structures 36 and 44. In such a modification, the appendage of the supporting structures would form an axial abutment for the valve piston 20 once assembly is complete, wherein said axial abutment predetermines the second axial end position of the valve piston 20.

The blocking body seat 42 surrounds the valve inlet P, i.e. the blocking body seat 42 itself directly forms the valve inlet P. A particularity of the example embodiment is that the blocking body seat 42 is formed directly by the valve housing 10 and not—as is usual in the prior art—provided by means of an additional insert piece which has to be joined to the valve housing 10. The valve housing 10 tapers conically in the region of its valve inlet P at the upstream end, directly forming the blocking body seat 42 on its internal surface area. The spring 43 acts on the blocking body 41 and presses it against and/or into the blocking body seat 42, such that the valve inlet P is closed. Because the blocking body seat 42 is provided directly by the valve housing 10, wherein "directly" means that an insert piece is not used in order to provide the blocking body seat 42, the blocking member 40 can be realized in a particularly simple way using a small number of easily manufactured parts. Another advantage of this embodiment is that the valve inlet P can exhibit a larger flow cross-section, thus causing less flow loss than is the case with conventional embodiments in which the blocking body seat 42 is provided by an insert piece. As compared to a blocking member in which the blocking body seat is formed by an insert piece, it is also possible to more reliably ensure that the blocking body seat cannot become detached. The danger of the blocking body seat becoming detached—in the example embodiment, from the valve housing 10—is not to be underestimated, in particular if pressure pulses occur.

If pressure fluid is fed to the control valve at the valve inlet P at a pressure which exceeds the spring force of the spring 43 and the pressure in the internal space 33 of the filter device, the blocking body 41 is lifted off the blocking body seat 42 and opens the valve inlet P. The pressure fluid flows through the valve inlet P, around the blocking body 41 and into the valve housing 10, and through an axial passage of the blocking member 40 and the axially connected filter inlet 34 into the filter enclosing structure 31, 32, i.e. into the internal space 33 of the filter device, from where the pressure fluid flows through the filter cross-section 35 and is cleaned—in particular, relieved of dirt particles—as it flows through the filter cross-section 35, and enters the part of the hollow space 21 of the piston which lies downstream of the filter device 30 over the entire filter cross-section 35. The hollow space 21 of the piston is connected to the continuative control port via the piston outlet 23 in accordance with the axial position of the valve piston 20, and via the control port to the setting chambers 8 or 9 which are assigned to the relevant control port A or B. The other group of setting chambers 8 and 9 is connected to its assigned valve outlet TA or TB via the control port A or B assigned to said group and is correspondingly relieved of pressure.

The axial guide of the inflowing pressure fluid also helps to reduce flow loss. Within this aspect, the valve inlet P, the downstream aperture of the blocking member 40, the filter inlet 34 and the piston inlet 22 are thus respectively arranged on an axially facing side of the valve housing 10, the blocking member 40, the filter device 30 and the valve piston 20. The inlets and apertures mentioned are axially flush, collectively on the axis R as is preferred but merely by way of example. In this way, the pressure fluid experiences the smallest possible deviations and thus correspondingly small flow loss between the valve inlet P and the piston outlet 23. This helps to increase the setting speed of the phase setter. In the example, the inlets and apertures are in axial succession. In principle, one or more inlets or an inlet and an aperture can be axially level, as is almost the case with the aperture of the blocking member 40 and the filter inlet 34.

The large filter cross-section 35 enabled by using the hollow space 21 of the piston also acts in favor of high setting speeds. Forming the filter device 30 as a hollow structure and/or filter enclosing structure 31, 32 is another factor which enables large filter cross-sections 35. In the first example embodiment, the filter enclosing structure 31 and 32 comprises a planar base 32. In one modification, the base 32 can for example also bulge outwards or can itself form a filter cross-section. In principle, the casing 31 can also for example be formed such that it conically tapers to a point, such that a base 32 in the narrower sense is not provided. In addition, elongated casings 31 which taper in some other way can also be realized. Providing the casing 31 as a cylindrical filter enclosing structure 31, 32 does however have production-related advantages.

With regard to arranging a filter device and a blocking member in the control valve, it should also be noted that the supporting structure of the filter device can also simultaneously form a support for a spring of the blocking member, for example the spring 43 of the blocking member 40, or a guide for the blocking body, for example the guide 45 for the blocking body 41. In such embodiments, the supporting structures 36 and 44 can be formed by a part formed as a unit or also by a fixedly joined unit, such that installing the filter device 30 also simultaneously provides the support for the spring of the blocking member or the guide of the blocking body.

Figure 6:
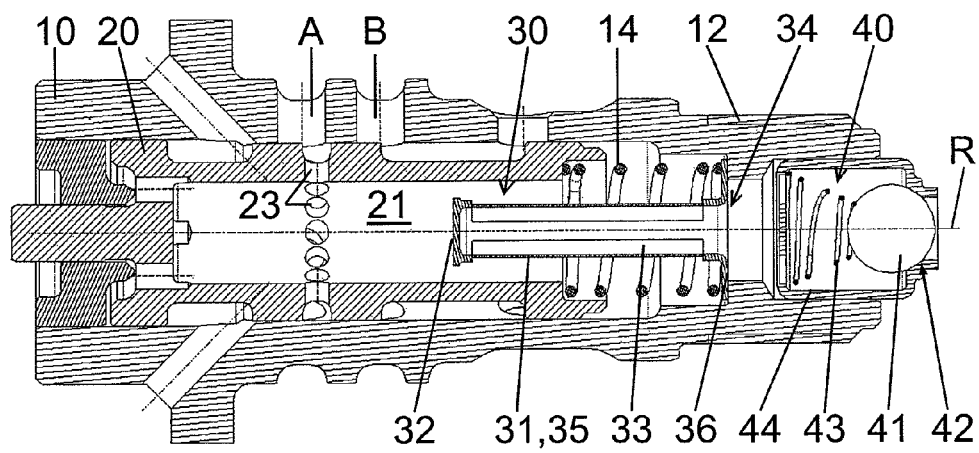
FIG. 6 shows a control valve in a second example embodiment.

FIG. 6 shows a control valve of a second example embodiment which is modified as compared to the control valve of the first example embodiment both in relation to the filter device 30 and in relation to the blocking member 40. The filter device 30 comprises a filter enclosing structure comprising a casing 31 which is modified as compared to the first example embodiment. The vast majority of the casing 31 is formed by filter material which however—unlike the first example embodiment—forms a smooth filter cross-section 35 in the shape of a simple cylinder, for example a circular cylinder or partial circular cylinder.

Unlike the first example embodiment, the filter device 30 is supported directly on the valve housing 10, independently of the blocking member 40. The supporting structure 36 can be fixedly joined, for example fused or glued, to the valve housing 10 or can also merely be pressed axially by the valve spring 14 against a seat formed by the valve housing 10. The statements made with respect to the first example embodiment also apply in this respect, the only difference being that the supporting structure 36 is not supported indirectly via an insert body but rather directly on the valve housing 10.

The blocking member 40 of the second example embodiment differs from the blocking member 40 of the first example embodiment substantially in that the blocking body seat 42 is formed by an insert piece which can in particular be a metallic body. The insert piece is sleeve-shaped and forms the supporting structure 44 for the spring 43 and the blocking body seat 42 in one piece. The insert piece also forms the valve inlet P which in the second example embodiment protrudes beyond the front end of the actual valve housing 10; in another modification, however, it can also terminate at the upstream end of the valve housing 10 or can be slightly short of the upstream end of the valve housing 10. The insert piece which forms the valve inlet P is regarded as forming part of the valve housing 10, not least because it is joined to the valve housing 10 such that it cannot be moved.

The control valve of the second example embodiment otherwise corresponds to the control valve of the first example embodiment, such that reference may be made to the statements made in that respect.

Figure 7:
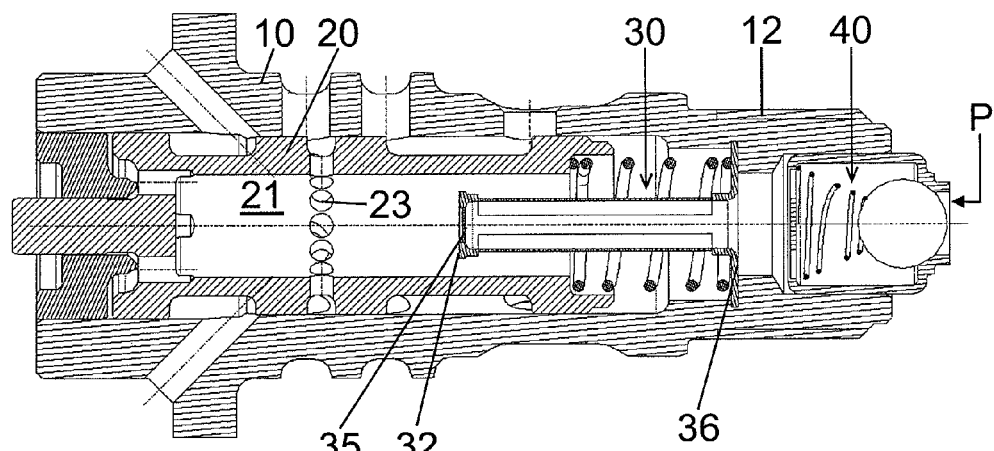
FIG. 7 shows a control valve in a third example embodiment.

FIG. 7 shows a control valve of a third example embodiment which comprises a modified filter device 30 and a modified blocking member 40, each as an integrated constituent, as compared to the first example embodiment. The blocking member 40 corresponds to the example embodiment in FIG. 6. The filter device 30 largely corresponds to the filter device 30 in FIG. 6. Unlike the filter device 30 in FIG. 6, a filter cross-section 35 made of filter material also forms a part of the base 32, for example in the form of a central opening which is filled in with filter material. The support on the valve housing 10 likewise largely corresponds to that of the second example embodiment. It differs from the support of the second example embodiment solely in that the supporting structure 36 engages in a positive fit with a groove or a plurality of recesses on the internal surface area of the valve housing 10.

Figure 8:
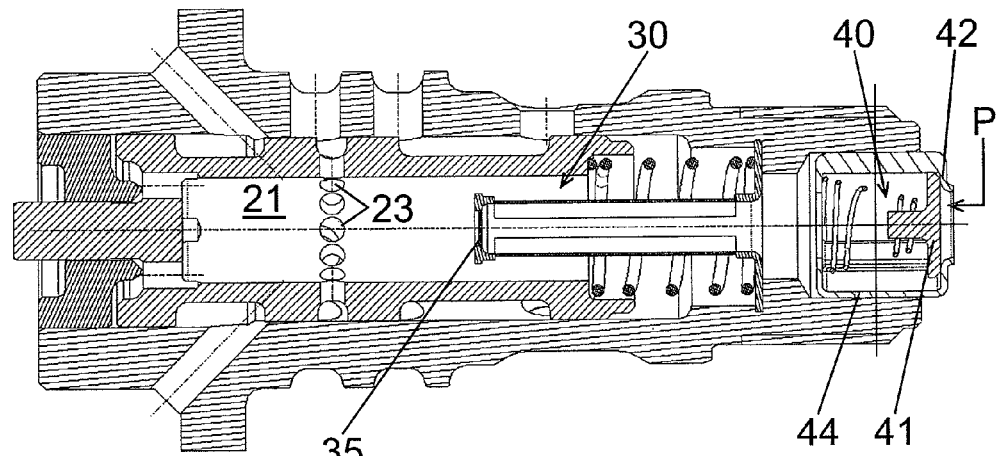
FIG. 8 shows a control valve in a fourth example embodiment.

FIG. 8 shows a control valve in a fourth example embodiment, comprising a filter device 30 corresponding to the third example embodiment and a re-modified blocking member 40. Unlike the example embodiments described thus far, the blocking member 40 does not comprise a spherical blocking body 41 but rather a disk-shaped or saucer-shaped blocking body 41. The example embodiments already described are otherwise also referenced in relation to this example embodiment.

Figure 9:
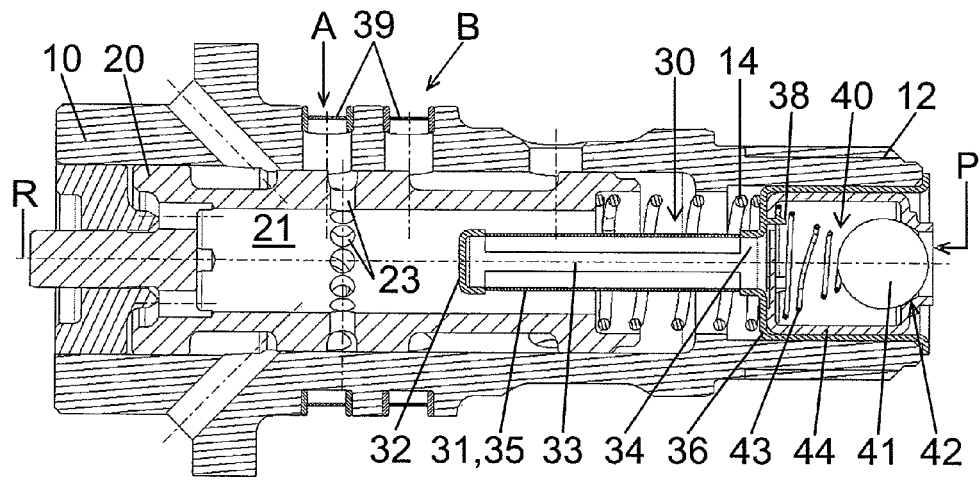
FIG. 9 shows a control valve in a fifth example embodiment.

FIG. 9 shows a control valve of a fifth example embodiment which comprises a filter device 30 comprising a filter enclosing structure 31, 32 corresponding to the second example embodiment (FIG. 6) and a supporting structure 36 which is modified as compared to the previous example embodiments. The supporting structure 36 is not simply formed merely as a flange as in the previous example embodiments but is rather extended in length in the shape of a sleeve towards the upstream end of the valve housing 10. It even protrudes beyond the upstream end of the valve housing 10, forming a rear grip, such that it surrounds the valve inlet P. The supporting structure 36 is pressed into the axially extending accommodating hollow space of the valve housing 10 and is axially positioned by the rear grip.

In the fifth example embodiment, the supporting structure 36 also serves to fasten the supporting structure 44 of the blocking member, in that the supporting structure 44 is locked in a locking engagement to one or more locking means 38 of the filter device 30. The locking means 38 is/are formed on the supporting structure 36. In addition to the positive fit in the region of the locking engagement, the supporting structure 44 can also be held in the valve housing 10 in a frictional fit, by being pressed into the sleeve-shaped supporting structure 36, wherein the rear grip of the supporting structure 36 ensures that it is securely held. In one modification, the supporting structures 36 and 44 can also be combined to form a single insert piece. The supporting structures 36 and 44 can also be pre-assembled, such that they already form a pre-assembled unit in the position shown relative to each other and can be incorporated as such.

In FIG. 9, other filter cross-sections 39 are provided in the region of the control ports A and B, such that the pressure fluid is again filtered as it flows to the setting chambers 8 or 9 and as it flows back from the pressure-relieved setting chambers 8 and 9. The filter material which forms the filter cross-sections 39 can correspond to the filter material of the filter device 30. The filter cross-sections 39 can in particular be provided on filter rings which surround the valve housing 10 in the region of the control ports A and B.

Figure 10:
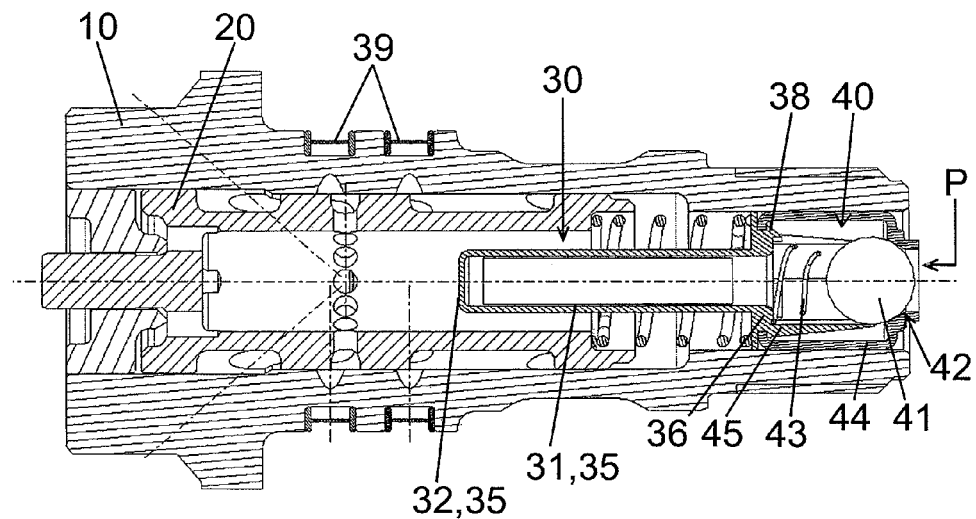
FIG. 10 shows a control valve in a sixth example embodiment.

FIG. 10 shows a control valve of a sixth example embodiment. In the filter device 30, at least the filter enclosing structure 31, 32 as a whole is formed from the filter material.

The supporting structure 36 is likewise modified as compared to the previous example embodiments, in that it forms one or more locking means 38 for a locking connection with the supporting structure 44 of the blocking member 40, as in the fifth example embodiment (FIG. 9), but unlike the supporting structure 36 of the fifth example embodiment is not fixed directly to the valve housing 10 but rather via the supporting structure 44 on the valve housing 10, namely by the locking engagement with the supporting structure 44. In addition, however, it can also be held in the valve housing 10 over its outer circumference in a frictional fit. The supporting structure 44 of the blocking member 40 is sleeve-shaped and fastened in a press seat in the axially extending accommodating space of the valve housing 10. It forms the blocking body seat 42. The supporting structure 36 of the filter device 30, by contrast, supports the spring 43 of the blocking member 40 and also forms an axial guide for the blocking body 41, wherein the axial guide is provided with the reference sign 45 in order to indicate this functionality.

Figure 11:
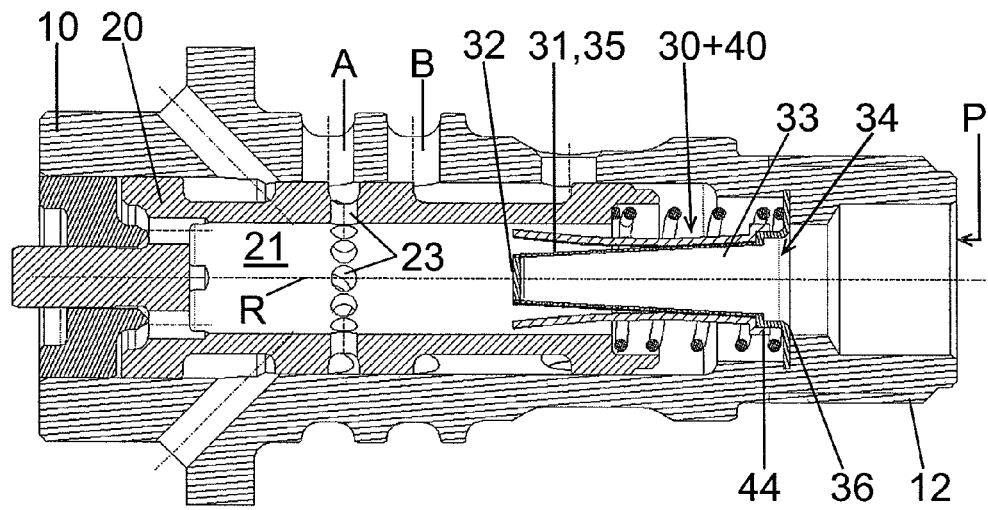
FIG. 11 shows a control valve in a seventh example embodiment in which a filter device and a blocking member are combined to form a mounting unit.

FIG. 11 shows a control valve of a seventh example embodiment. A substantial difference with respect to the other example embodiments is that the filter device 30 and the blocking member 40 are formed in immediate proximity, almost at the same location. In order to achieve this, an abutting structure and a blocking structure are arranged facing the outer surface of the filter enclosing structure 31, 32. The abutting structure forms a number of tongue-shaped abutments 46, which splay out towards the downstream end of the filter enclosing structure 31, 32, over the circumference of the filter enclosing structure 31, 32. The blocking structure overlaps the filter cross-section 35 and is impermeable to the pressure fluid.

Figure 12:
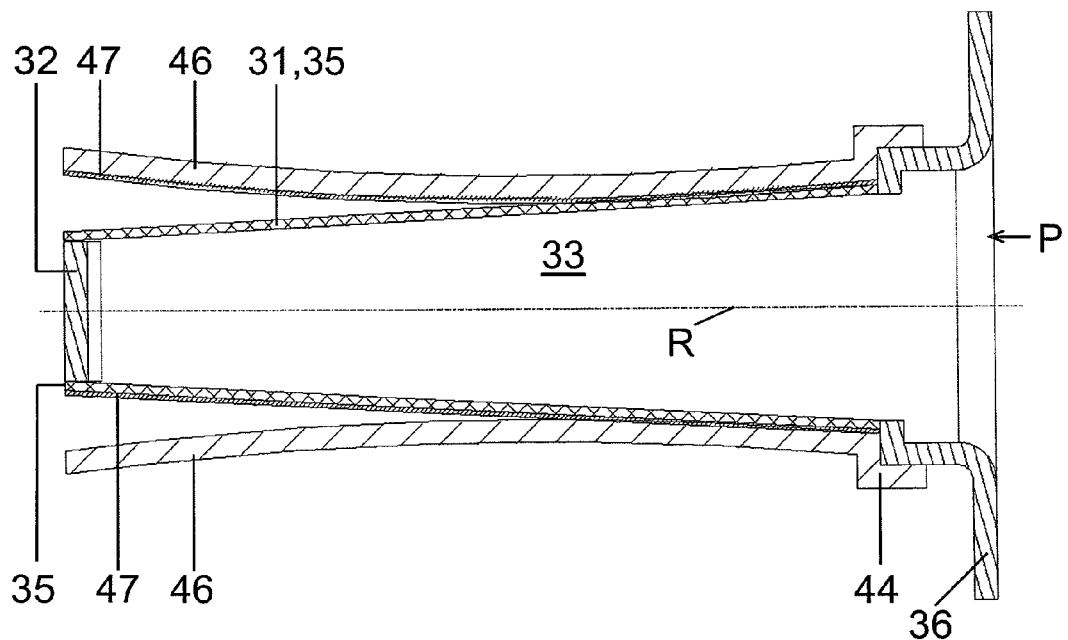
FIG. 12 shows the mounting unit consisting of the filter device and the blocking member.

FIG. 12 depicts the filter device 30 and the blocking member 40 which is combined with it, before they are incorporated into the control valve. The blocking structure comprises strip-shaped and/or tongue-shaped, elastically flexible blocking elements 47 which overlap with the abutments 46 and elastically splay out from the casing 31 of the filter device 30 when a pressure burden prevails in the internal space 33 of the filter device, exposing the filter cross-section 35 of the filter casing 31, such that the pressure fluid can flow through the filter device 30. The flexible blocking strips or elements 47 replace the blocking body 41 of the other example embodiments. Like the blocking body 41, they prevent pressure fluid from flowing back from the piston aperture 23 through the filter device 30 towards the valve inlet P. Solely for the purpose of illustration, the upper blocking element 47 is shown in the longitudinal section of FIG. 12 in its opened state in which its external side abuts one of the abutments 46 of the outer abutting structure, while the lower blocking element 47 is shown in its position corresponding to the closed state of the blocking member 40, in which it is placed onto the filter casing 31. When the blocking member 40 is functioning properly, all the blocking elements 47 either assume the closed state abutting the filter casing 31 or abut the assigned abutment 46, in accordance with the pressure conditions, such that the blocking member 40 is either open or closed. The filter cross-section 35 is likewise formed in strips distributed over the casing 31 in accordance with the blocking elements 47.

Combining the filtering function and the blocking function enables the valve housing 10 and therefore the control valve to be axially shortened. This option is not however used in the control valve depicted in FIG. 11.

The supporting structure 44 of the blocking member 40 is supported on the supporting structure 36 of the filter device 30 which is supported directly in the valve housing 10, for example as in the third example embodiment (FIG. 7). The support arrangement could also be reversed, i.e. it would also be possible, given a corresponding modification, for the filter device 30 to instead be supported on the valve housing 10 via the blocking member 40 and/or its supporting structure. The filter device 30 and the blocking member 40 form a mounting unit which is already joined before it is incorporated into the control valve, which facilitates incorporating it into the control valve. In principle, however, it would be conceivable to embody the filter device 30 and the blocking member 40 separately from each other and incorporate them successively, even in the embodiment in which they are combined at the same location.

Figure 13:
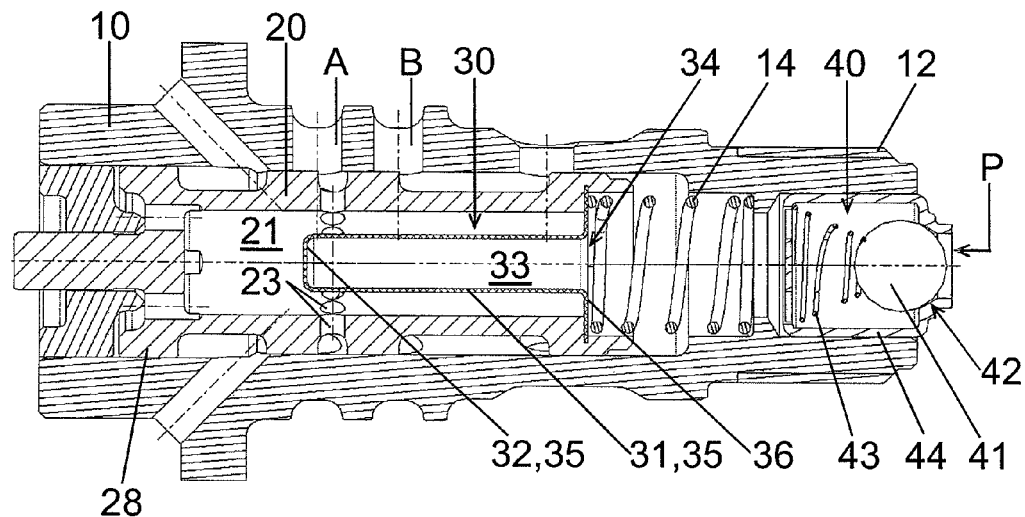
FIG. 13 shows a control valve in an eighth example embodiment.
Figure 14:
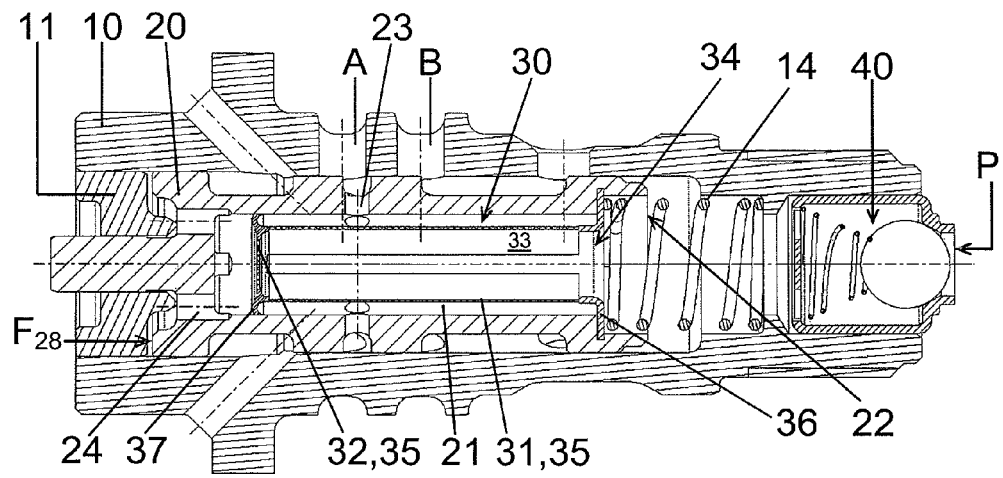
FIG. 14 shows a control valve in a ninth example embodiment.

FIGS. 13 and 14 show additional example embodiments which differ from the example embodiments of FIGS. 1 to 12 in that the filter device 30 is not supported on the valve housing 10 but rather on the valve piston 20 and is correspondingly slaved in the axial movements of the valve piston 20. Correspondingly, one end of the valve spring 14 is supported on the valve housing 10 and the other end is supported via the supporting structure 36 of the filter device 30 on the valve piston 20; in this way, the valve spring 14 charges the valve piston 20 with its spring force in the direction of the end position assumed.

The filter enclosing structure 31, 32 of the filter device 30 of the eighth example embodiment (FIG. 13) corresponds to that of the sixth example embodiment (FIG. 10). It is formed as a whole, including its supporting structure 36, as an axially elongated, sleeve-shaped part which consists entirely of the filter material. It can for example be formed by stretch-forming or deep-drawing from a planar blank consisting of the filter material. Alternatively, however, it can also be joined from a number of parts.

Supporting the filter device on the valve piston 20 has the advantage that the filter enclosing structure 31, 32 can extend over a greater axial length within the valve piston 20, since less consideration has to be given to production tolerances and changes in the dimensions during operation because there is no relative movement. Conversely, however, the flow resistance which has to be overcome in order for the fluid to flow through the filter device 30 generates an axial force which acts on the valve piston 20. This axial force can be at least partially opposed by additionally and complementarily increasing the size of the compensating area provided by the widening 28, i.e. the size of the piston area F28 (FIG. 4) can be further increased. The axial force generated by supporting the filter device 30 on the valve piston 20 is at least partially compensated for by the filter device 30 in the ninth example embodiment shown in FIG. 14. The filter device 30 of the ninth example embodiment is complementarily modified in a specific way for this purpose, namely in that an outer circumference of the filter enclosing structure 31, 32 circumferentially comprises a seal 37 which sub-divides the hollow space 21 of the valve piston 20 into a first partial space and a second partial space, and the two partial spaces are fluidically separated from each other by the seal 37. The piston outlet 23 ports in the first partial space, such that it is connected to one of the control ports A and B, depending on the position of the valve piston 20. The second partial space is connected to the rear side of the valve piston, which lies axially opposite the axially facing closure wall 11, via the feed 24.

While the phase setter is in operation, a part of the pressure fluid which flows into the filter device 30 through the filter inlet 34 passes into the first partial space via the filter cross-section 35 provided on the circumference of the filter enclosing structure 31, 32 and passes from there to the assigned setting chambers 8 or 9 via the piston outlet 23 and the control port A or B which is connected in accordance with the piston position. Another part of the pressure fluid passes through the filter cross-section 35 provided in the base 32 and into the second partial space, where it acts on the rear side of the filter device 30, in particular on the annular area of the seal 37 which protrudes outwards beyond the internal space 33 of the filter device, and so generates an axial force which acts on the filter device 30 and counteracts and compensates for the axial force which arises due to the throughflow resistance of the filter device 30.

If, as is preferred, the axial force which acts on the valve piston 20 in the direction of the setting member 15 (FIG. 1) is compensated for by means of a radial widening 28 of the valve piston 20, then the ability of fluid to flow through the filter device 30 towards the second partial space is associated with the pressure which prevails at the filter inlet 34 also being available for compensating for the axial force, wherein it can be advantageous if the filter cross-section 35 over which the connection between the internal space 33 of the filter device and the second partial space exists exhibits a lower throughflow resistance than the filter cross-section 35 which connects the internal space 33 of the filter device to the piston aperture 23. It can also be possible, as applicable, to completely omit the filter cross-section 35 in the base 32, wherein it is however preferred if the pressure fluid passing into the second partial space is also filtered.

As already mentioned and preferred, but merely by way of example, the second partial space is connected via the compensating feed 24 to the space which is axially limited by the axially facing closure wall 11 and the valve piston 20. This embodiment has the additional advantage that when the valve piston 20 moves from the second piston position towards the first piston position assumed in FIG. 14, pressure fluid flows out of the space between the axially facing closure wall 11 and the rear side of the valve piston 20, through the feed 24 and into the second partial space and passes through the filter cross-section 35 provided in the base 32, back into the internal space 33 of the filter device. This generates a backflow effect which is associated with the filter cross-section 35 being cleaned not only in the region of the base 32 but also in the region of the casing 31.

The seal 37 can in particular be formed as a sealing lip, such that in order to be assembled, the filter device 30 can be pushed through the piston inlet 22 into the hollow space 21 of the piston and joined to the valve piston 20 in the joining position by means of its supporting structure 36. The seal 37 is formed in the region of the base 32 in order to obtain as long a filter cross-section 35 as possible in the region of the filter casing 31.

Aside from the differences described, the statements made with respect to the first example embodiment are also referenced again in this example embodiment, wherein the filter cross-section 35 formed by the casing 31 is not however corrugated but rather smoothly cylindrical, such that the filter cross-section 35 as a whole corresponds for example to that of the example embodiment in FIG. 7. The blocking member 40 likewise corresponds to earlier example embodiments, for example the example embodiments of FIGS. 6 and 7.

Figure 15:
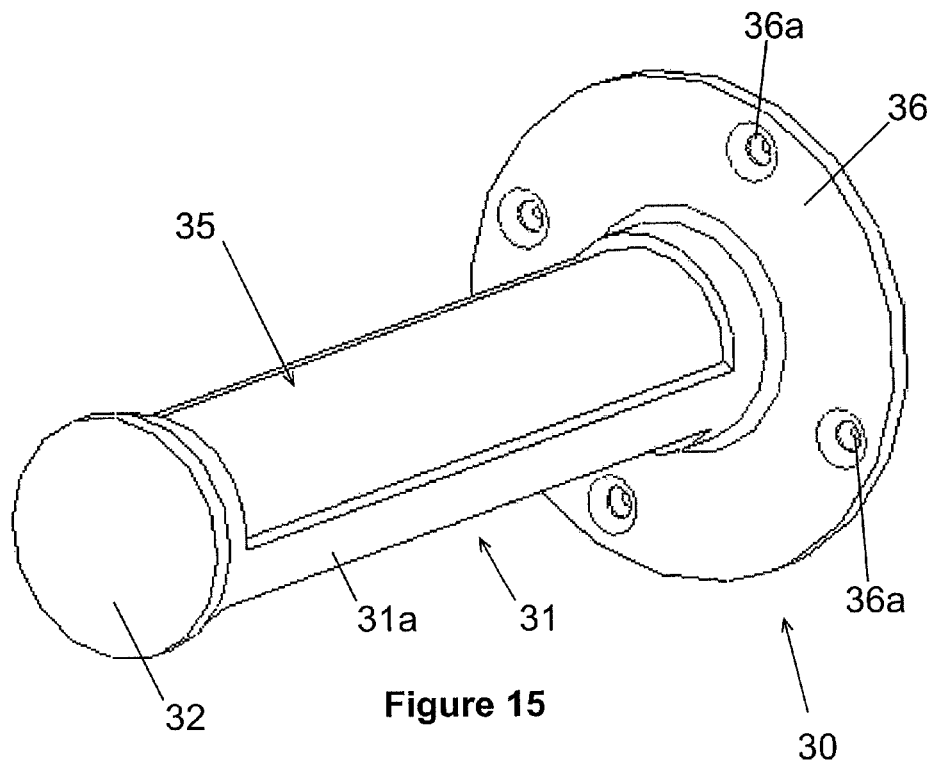
FIG. 15 shows a filter device in a first perspective view.
Figure 16:
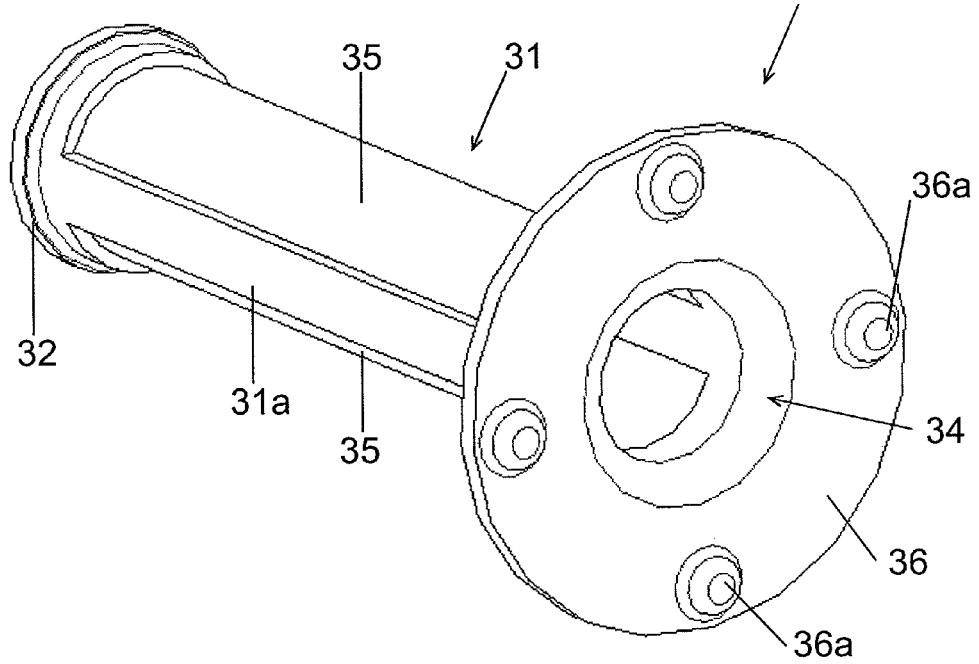
FIG. 16 shows the filter device of FIG. 15 in a second perspective view.

FIGS. 15 and 16 show a filter device 30, each in a perspective view and before it is incorporated into a control valve. As already described with respect to the first example embodiment, the filter device 30 comprises a bearing structure which comprises the base 32, the supporting structure 36 and the axially extending connecting stays 31*a*. The connecting stays 31*a* and the filter cross-section 35 form the casing 31 of the filter device 30. To this extent, the filter device 30 of FIGS. 15 and 16 corresponds to the second example embodiment (FIG. 6) and also, with the exception of the filter cross-section 35 which is merely in the shape of a simple sleeve, to the filter device 30 of the first example embodiment.

The bearing structure 31*a*, 32, 36 is formed from a plastically deformable material, preferably a metal. The supporting structure 36 comprises a flange which protrudes radially outwards beyond the casing 31 and via which it is supported on an axial support of the valve housing 10 or valve piston 20, for example as shown in FIGS. 6, 7, 8, 11, 13 and 14. The axial support can also be formed by an intermediate body which is supported on either the valve housing 10 or the valve piston 20, directly or via one or more other intermediate bodies. An "axial support of the valve housing 10 or valve piston 20" means only that the axial support is ultimately provided on the valve housing 10 or valve piston 20, either directly or via one or more intermediate bodies.

The axially facing area of the flange of the supporting structure 36 which contacts the axial support when the filter device is incorporated comprises axially projecting contact elements 36*a* which are arranged in a uniform distribution over the axially facing area, as is preferred. The contact elements 36*a* are formed as local bulges and/or studs on the flange. They can be plastically deformed and thus axially compressed by an axial pressure. This can in particular be achieved, as the filter device 30 is incorporated, by pressing the filter device 30 against the axial support in the region of the flange of the supporting structure 36. Given a corresponding pressure force, the contact elements 36*a* can even be pressed flat in the extreme case, such that a planar axially facing area is obtained on the flange.

Providing the supporting structure 36 with contact elements 36a in the region of the flange has advantages in particular in example embodiments in which the supporting structure 36 is pressed against the axial support of the valve housing 10 or valve piston 20 by means of the valve spring 14. By axially compressing the contact elements 36a, it is possible to set a biasing force with which the valve spring 14 acts on the valve piston 20 in the end position of the valve piston 20 shown in the figures, i.e. the minimum spring force when the filter device is incorporated, or to set the spring path of the valve spring 14 or to compensate for axial production or assembly tolerances. When the filter device 30 is incorporated, the supporting structure 36 has only to be pressed against the axial support with the corresponding force and the contact elements 36a axially compressed in accordance with the force. In addition to being axially pressed onto the axial support in this way, the supporting structure 36 can be held on the valve housing 10 or valve piston 20 over its circumference in a frictional fit.

Figure 17:
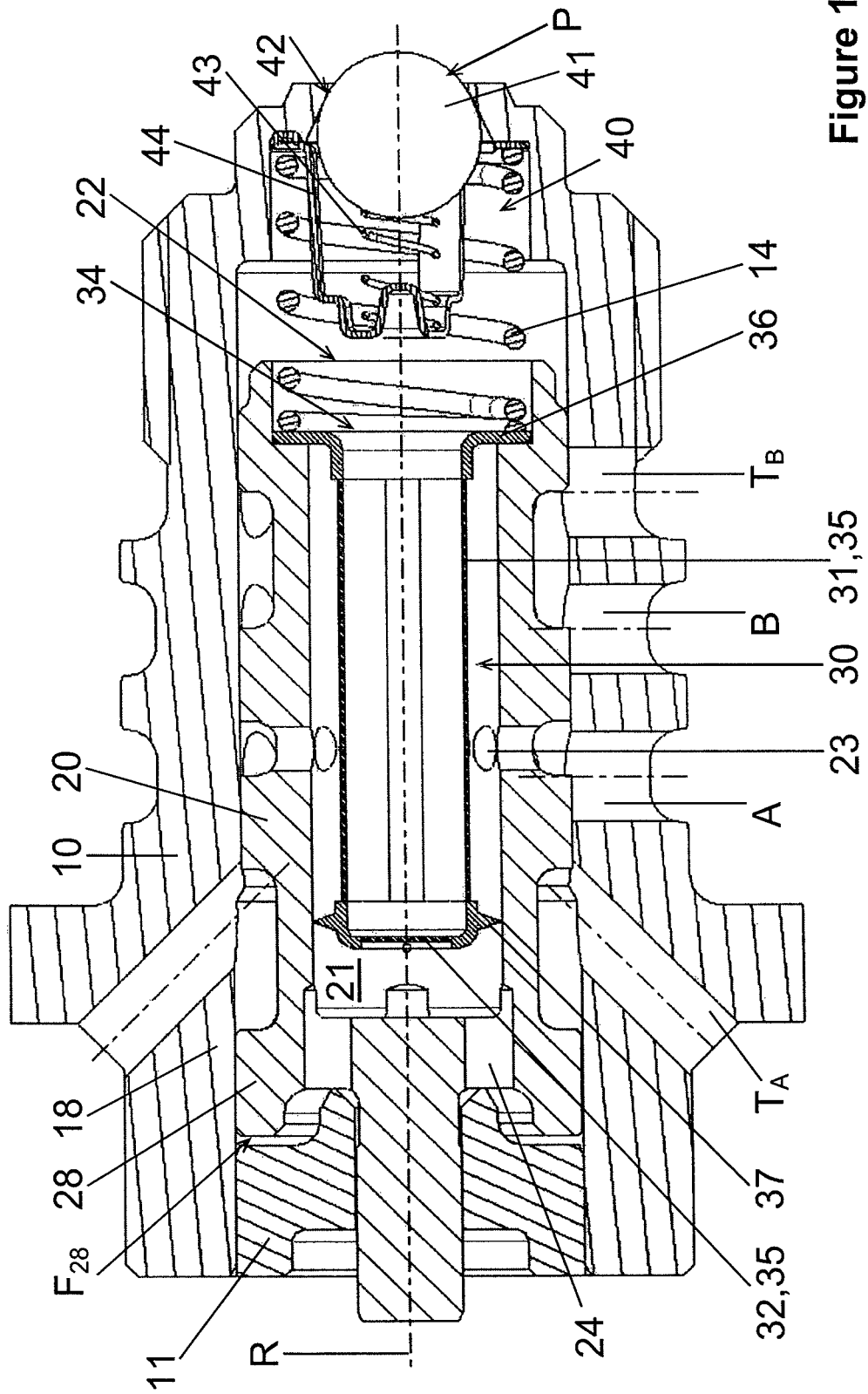
FIG. 17 shows a control valve in a tenth example embodiment.

FIG. 17 shows a control valve of a tenth example embodiment. The control valve corresponds to the ninth example embodiment (FIG. 14) with regard to the filter device 30, i.e. as in the ninth example embodiment, it is axially supported on the valve piston 20 and comprises a seal 37 which sub-divides the hollow space 21 of the valve piston 20 into a first and second partial space, as described with respect to the ninth example embodiment, for the purpose of compensating for an axial force exerted by the pressure fluid on the valve piston 20. The statements made with respect to the ninth example embodiment apply in this respect.

As in the first example embodiment above, the valve housing 10 directly forms the blocking body seat 42 of the blocking member 40 in the tenth example embodiment. Like the supporting structure 36 of the filter device 30, the supporting structure 44 of the blocking member 40 comprises a flange which projects radially outwards and via which it is axially supported on the valve housing 10. The flange of the supporting structure 44 can advantageously be provided with contact elements 36a, corresponding to the flange of the supporting structure 36. The supporting structures 36 and 44 are arranged such that the valve spring 14 acts on the supporting structure 36 in one axial direction and on the supporting structure 44 in the other axial direction and is for example clamped between the two supporting structures 36 and 44. With regard to axially supporting the supporting structure 44 and the contact elements 36a optionally provided on it, reference is made to the statements made with respect to the filter device 30 of FIGS. 15 and 16. As already mentioned, the contact elements 36a can be provided on both the supporting structure 36 and the supporting structure 44 as described and can be axially compressed when the supporting structures 36 and 44 are incorporated, in order to adjust the valve spring 14. In another modification, the contact elements 36a can also be provided on the supporting structure 44 of the blocking member 40 only and not on the supporting structure 36.

It should also be noted with respect to the filter enclosing structures 31, 32 and the filter cross-sections 35 formed by them and with respect to the supporting structures 36 that any of the filter enclosing structures 31, 32 can in principle be combined with any of the supporting structures 36 of the different example embodiments. This applies similarly with regard to the blocking member 40. Thus, for example, the spherical blocking bodies 41 can each be replaced with a disk-shaped or saucer-shaped blocking body 41 in accordance with the example embodiment of FIG. 8. Equally, the disk-shaped and/or saucer-shaped blocking body 41 in the example embodiment of FIG. 8 can, with minor adjustments, be replaced with the spherical blocking body 41 of the other example embodiments.

It should in principle also be noted that providing both a filter device 30 and a blocking member 40 in the form of integrated constituents of the control valve is particularly advantageous, but even providing for example only the filter device 30 or only the blocking member 40 as an integrated constituent of the control valve is advantageous.

Although the invention has been shown and described with respect to one or more particular preferred embodiments, it is clear that equivalent amendments or modifications will occur to the person skilled in the art when reading and interpreting the text and enclosed drawing(s) of this specification. In particular with regard to the various functions performed by the elements (components, assemblies, devices, compositions, etc.) described above, the terms used to describe such elements (including any reference to a "means") are intended, unless expressly indicated otherwise, to correspond to any element which performs the specified function of the element described, i.e. which is functionally equivalent to it, even if it is not structurally equivalent to the disclosed structure which performs the function in the example embodiment(s) illustrated here. Moreover, while a particular feature of the invention may have been described above with respect to only one or some of the embodiments illustrated, such a feature may also be combined with one or more other features of the other embodiments, in any way such as may be desirable or advantageous for any given application of the invention.

LIST OF REFERENCE SIGNS 1 cam shaft
2 machine housing
2a cover
3 stator
4 drive wheel
5 impeller
5a stator vane
6 cover
7 rotor
7a rotor vane
7b connecting channel
8 early setting chamber
9 late setting chamber
10 valve housing
11 axially facing closure wall
12 connecting portion
13 —
14 valve spring
15 setting member
16 coil
17 anchor
18 widened housing portion
19 —
20 valve piston
21 hollow space
22 piston inlet
23 piston outlet
24 compensating feed
25 coupling member
26 recess
27 recess
28 widening, widened piston portion
29 —
30 filter device 31 filter enclosing structure, casing 31a connecting stay
32 filter enclosing structure, base
33 internal space of the filter device
34 filter inlet
35 filter cross-section
36 supporting structure 36a contact element
37 seal
38 locking means
39 filter cross-section
40 blocking member
41 blocking body
42 blocking body seat
43 spring
44 supporting structure
45 guide
46 abutment
47 blocking element
48 —
49 —
50 latching pin
A control port
B control port
D rotational direction of the stator
$F_{25}$ cross-sectional area
$F_{28}$ cross-sectional area
P valve inlet
R rotational axis, central axis
$T_A$ valve outlet
$T_B$ valve outlet

What is claimed is:

1. A control valve for controlling a pressure fluid, said control valve comprising:
   a valve housing comprising a valve inlet for the pressure fluid, a control port for connecting to an assembly which is to be operated using the pressure fluid, and a valve outlet;
   a valve piston which is moveable in the valve housing along an axis and which comprises a hollow space through which the pressure fluid flows from the valve inlet to the control port; and
   a filter device which is arranged in the control valve and comprises a filter cross-section which filters the pressure fluid as it passes through it,
   wherein at least a part of the filter cross-section of the filter device is situated in the hollow space of the valve piston and the filter device is supported on the valve housing and protrudes into the valve piston.

2. The control valve according to claim 1, wherein the filter device comprises a filter enclosing structure which extends in the hollow space of the valve piston and surrounds an internal space of the filter device, and a filter inlet into the internal space of the filter device, and wherein the filter cross-section forms at least a part of an enclosing area of the filter enclosing structure which surrounds the internal space of the filter device, such that the pressure fluid flows through the filter inlet into the internal space of the filter device and from the internal space of the filter device through the filter cross-section to the control port.

3. The control valve according to claim 2, wherein the filter cross-section forms at least a predominant part of the enclosing area of the filter enclosing structure.

4. The control valve according to claim 2, wherein the filter enclosing structure comprises an axially extending casing and a base which is axially spaced from the filter inlet, and wherein the filter cross-section forms at least a part of an area of the base or a part of an area of the casing between the filter inlet and the base.

5. The control valve according to claim 4, wherein the filter cross-section forms at least a predominant part of the area of the base.

6. The control valve according to claim 4, wherein the filter cross-section forms at least a predominant part of the area of the casing between the filter inlet and the base.

7. The control valve according to claim 1, wherein an axial filter opening of the filter device forms a filter inlet, such that the pressure fluid flows axially into the filter device.

8. The control valve according to claim 7, wherein the axial filter opening of the filter device lies at an axial end of the filter device.

9. The control valve according to claim 1, wherein: the valve piston is moveable counter to a restoring force of a valve spring; the filter device comprises a supporting structure via which the filter device is supported on the valve housing; and the valve spring is supported on the supporting structure.

10. The control valve according to claim 9, wherein the filter device is supported axially on the valve housing via the supporting structure.

11. The control valve according to claim 1, wherein an axial housing opening of the valve housing forms the valve inlet, such that the pressure fluid is axially fed to the control valve.

12. The control valve according to claim 11, wherein the axial housing opening of the valve housing lies at an axial end of the valve housing.

13. The control valve according to claim 11, wherein the valve piston comprises an axial piston inlet through which the pressure fluid axially flows into the hollow space of the valve piston.

14. The control valve according to claim 13, wherein the pressure fluid axially flows into the hollow space of the valve piston within the filter device.

15. The control valve according to claim 1, wherein a seal which projects outwards from the filter device towards a circumferential internal area of the valve piston sub-divides the internal area of the valve piston into a first partial space which is connected to the control port and a second partial space which is separated from the control port, and wherein a part of the pressure fluid which flows through the filter device flows into the second partial space, such that a pressure which is set in the second partial space as the pressure fluid flows through the filter device acts on the seal and thus on the filter device.

16. The control valve according to claim 15, wherein the part of the pressure fluid which flows through the filter device into the second partial space flows through a part of the filter cross-section.

17. The control valve according to claim 1, wherein the valve piston comprises an axial piston inlet through which the pressure fluid flows into the hollow space, and a feed which connects the hollow space to an axially facing area of the valve piston which axially faces away from the piston inlet.

18. The control valve according to claim 17, wherein a seal which projects outwards from the filter device towards a circumferential internal area of the valve piston sub-divides the internal area of the valve piston into a first partial space which is connected to the control port and a second partial space which is separated from the control port, and wherein the axially facing area is connected to the second partial space via the feed.

19. The control valve according to claim 1, wherein a filter material which forms the filter cross-section is a fabric, a mesh, a fleece, an open-pored foam material or an open-pored sintered material or is formed from a combination of at least two of these materials.

20. The control valve according to claim 1, wherein a blocking member which serves to prevent the pressure fluid from flowing back from the control port to the valve inlet is a constituent of the control valve.

21. The control valve according to claim 20, wherein a supporting structure of the filter device is fixedly connected to or formed in one piece with a supporting structure of the blocking member, or one of the supporting structures is axially supported on the other supporting structure in a pressure contact.

22. The control valve according to claim 20 and one of the following features:
   the blocking member is arranged upstream of the filter device between the valve inlet and the filter device;
   the blocking member is arranged in a filter enclosing structure of the filter device which comprises at least a part of the filter cross-section; and
   the filter device and the blocking member are combined to form a mounting unit which is arranged as a unit in the control valve.

23. The control valve according to claim 20, wherein the blocking member comprises a blocking body, a blocking body seat and a spring which presses the blocking body into the blocking body seat.

24. The control valve according to claim 23, wherein the valve housing forms the blocking body seat directly.

25. The control valve according to claim 20, wherein the blocking member comprises one or more blocking elements which overlap the filter cross-section, and wherein the blocking element or elements are moveable out of the overlap with the filter cross-section, counter to an elastic restoring force.

26. The control valve according to claim 25, wherein the blocking element or elements are moved by being elastically bent away.

27. The control valve according to claim 1, wherein:
   the control valve comprises a valve spring which acts axially on the valve piston;
   the filter device or a blocking member which serves to prevent the pressure fluid from flowing back from the control port to the valve inlet comprises or respectively comprise a supporting structure comprising a flange;
   the supporting structure is axially supported on a support of the valve housing; and
   the flange comprises a plurality of contact elements on an axially facing area which axially faces the support,
   wherein the contact elements are axial projections or are pressed flat and are pressed against the axial support by the valve spring.

28. The control valve according to claim 1, wherein the control valve is arranged centrally in relation to an arrangement consisting of a stator and a rotor.

29. The control valve according to claim 28, wherein the valve housing comprises a connecting portion for a connection, fixed in terms of torque, between the rotor and a cam shaft.

30. A phase setter for adjusting the rotational angular position of a cam shaft relative to a crankshaft of a combustion engine, said phase setter comprising:
   a stator which can be rotary-driven by the crankshaft;
   a rotor which can be rotary-driven about a rotational axis by the stator and can be coupled to the cam shaft in order to rotary-drive it, and which forms setting chambers with the stator which can be charged with a pressure fluid in order to be able to adjust the rotor relative to the stator about the rotational axis;
   and a control valve comprising:
   a valve housing comprising a valve inlet for the pressure fluid, control ports which are connected to the setting chambers, and a valve outlet;
   a valve piston which is moveable in the valve housing along an axis and which comprises a hollow space through which the pressure fluid flows from the valve inlet to the control ports;
   and a filter device which is arranged in the control valve and comprises a filter cross-section which filters the pressure fluid as it passes through it,
   wherein at least a part of the filter cross-section of the filter device is situated in the hollow space of the valve piston and the filter device is supported on the valve housing and protrudes into the valve piston.

31. The phase setter according to claim 30, wherein the valve housing extends axially in the rotor.

* * * * *